US012614192B2

(12) United States Patent
Lynn et al.

(10) Patent No.: US 12,614,192 B2
(45) Date of Patent: Apr. 28, 2026

(54) SYSTEMS AND METHODS FOR TRACKING TECHNICAL ENGAGEMENT OF DIGITAL RESOURCES

(71) Applicant: Wells Fargo Bank, N.A., San Francisco, CA (US)

(72) Inventors: Victoria Lynn, Charlotte, NC (US); Shelly Theriault McDevitt, Charlotte, NC (US); Mark Farmer, Charlotte, NC (US); Myranda Pierce, Charlotte, NC (US); Gokarna KC, Charlotte, NC (US); Jeffrey Dufresne, Charlotte, NC (US); Mark Pendergrass, Charlotte, NC (US); Carrie Anne Hanson, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 120 days.

(21) Appl. No.: 18/529,651

(22) Filed: Dec. 5, 2023

(65) Prior Publication Data

US 2025/0182136 A1 Jun. 5, 2025

(51) Int. Cl.
G06Q 30/016 (2023.01)
G06F 8/65 (2018.01)

(52) U.S. Cl.
CPC ............. G06Q 30/016 (2013.01); G06F 8/65 (2013.01)

(58) Field of Classification Search
None
See application file for complete search history.

(56) References Cited

U.S. PATENT DOCUMENTS

| | | | | |
|---|---|---|---|---|
| 11,392,605 B1 * | 7/2022 | Baskaran | .............. | G06F 16/254 |
| 11,514,403 B2 | 11/2022 | Sharma | | |
| 11,526,540 B2 * | 12/2022 | Klemm | .............. | G06F 16/3329 |
| 2007/0226679 A1 | 9/2007 | Jayamohan | | |
| 2011/0206198 A1 * | 8/2011 | Freedman | ......... | H04M 3/42221 379/265.03 |

(Continued)

OTHER PUBLICATIONS

Narne, Harish. "Intelligent E-Learning Systems: Machine Learning-Driven Adaptive Frameworks for Enhanced Engagement and Retention." (2021): 390-395. (Year: 2021).*

(Continued)

*Primary Examiner* — Andrew B Whitaker
(74) *Attorney, Agent, or Firm* — K&L Gates LLP

(57) ABSTRACT

Systems, apparatuses, methods, and computer program products are disclosed for monitoring and tracking technical engagements between digital resources. An example method includes deploying a machine learning monitoring application to a computing environment comprising one or more of a computing device or a network channel and detecting an engagement metric associated with a target technology of the computing environment and a user account of the computing environment. The example method further includes generating name-value pair data representative of the engagement metric, the user account, and a timestamp token and generating a technical engagement score representative of a probability of a successful utilization of the target technology by the user account. The example method further includes initializing an actionable instruction set based on a comparison of the technical engagement score to a technical engagement threshold.

20 Claims, 9 Drawing Sheets

(56) References Cited

U.S. PATENT DOCUMENTS

| 2013/0096892 | A1* | 4/2013 | Essa ......................... G09B 7/00 |
| | | | 703/2 |
| 2013/0224698 | A1 | 8/2013 | Gillam |
| 2013/0268260 | A1* | 10/2013 | Lundberg ............... G06F 40/58 |
| | | | 704/8 |
| 2014/0019212 | A1* | 1/2014 | Lieblich ............ G06Q 10/0637 |
| | | | 705/7.36 |
| 2014/0180749 | A1 | 6/2014 | Woodward |
| 2014/0188442 | A1* | 7/2014 | Zelenka ................ G06Q 50/20 |
| | | | 703/2 |
| 2016/0283948 | A1* | 9/2016 | Snapir ................... G06Q 10/20 |
| 2016/0371071 | A1* | 12/2016 | Reese ..................... H04L 67/34 |
| 2017/0289284 | A1* | 10/2017 | Drutsa ................. H04L 67/306 |
| 2018/0240015 | A1* | 8/2018 | Martin ................... G06N 3/047 |
| 2018/0367483 | A1* | 12/2018 | Rodriguez ............. H04L 65/60 |
| 2019/0373069 | A1* | 12/2019 | Keen ...................... G06Q 50/01 |
| 2020/0327506 | A1* | 10/2020 | Litman ............. G06Q 10/1053 |
| 2021/0004246 | A1* | 1/2021 | Ullmann ................ G06F 9/453 |
| 2021/0065222 | A1* | 3/2021 | Schuh .................. H04L 67/306 |
| 2021/0264345 | A1* | 8/2021 | Peck ............. G06Q 10/063114 |
| 2022/0357977 | A1* | 11/2022 | Kalou ............. G06Q 10/06393 |
| 2025/0094690 | A1* | 3/2025 | DeCharms ............ G06N 20/00 |
| 2025/0148931 | A1* | 5/2025 | Sait .......................... G06N 3/08 |

OTHER PUBLICATIONS

Narne (Year: 2021).*

* cited by examiner

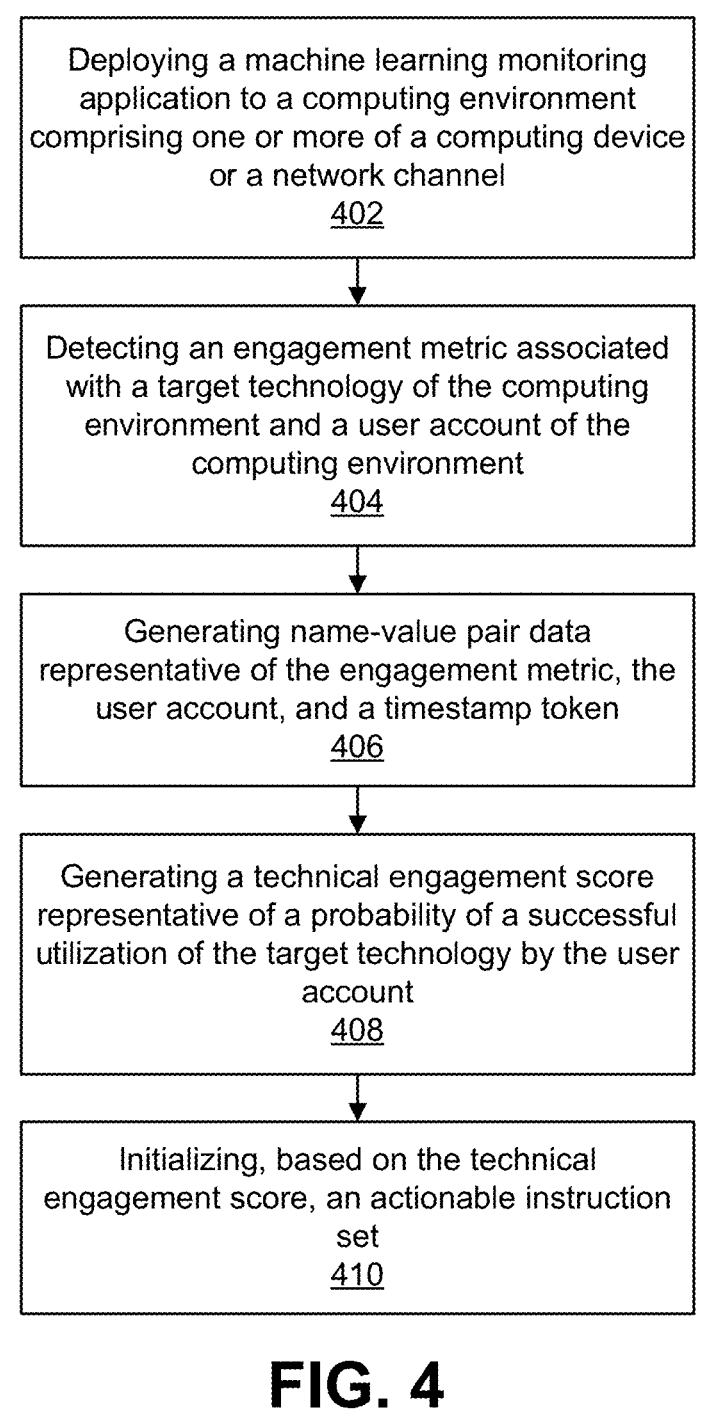

Deploying a machine learning monitoring
application to a computing environment
comprising one or more of a computing device
or a network channel
402

Detecting an engagement metric associated
with a target technology of the computing
environment and a user account of the
computing environment
404

Generating name-value pair data
representative of the engagement metric, the
user account, and a timestamp token
406

Generating a technical engagement score
representative of a probability of a successful
utilization of the target technology by the user
account
408

Initializing, based on the technical
engagement score, an actionable instruction
set
410

FIG. 4

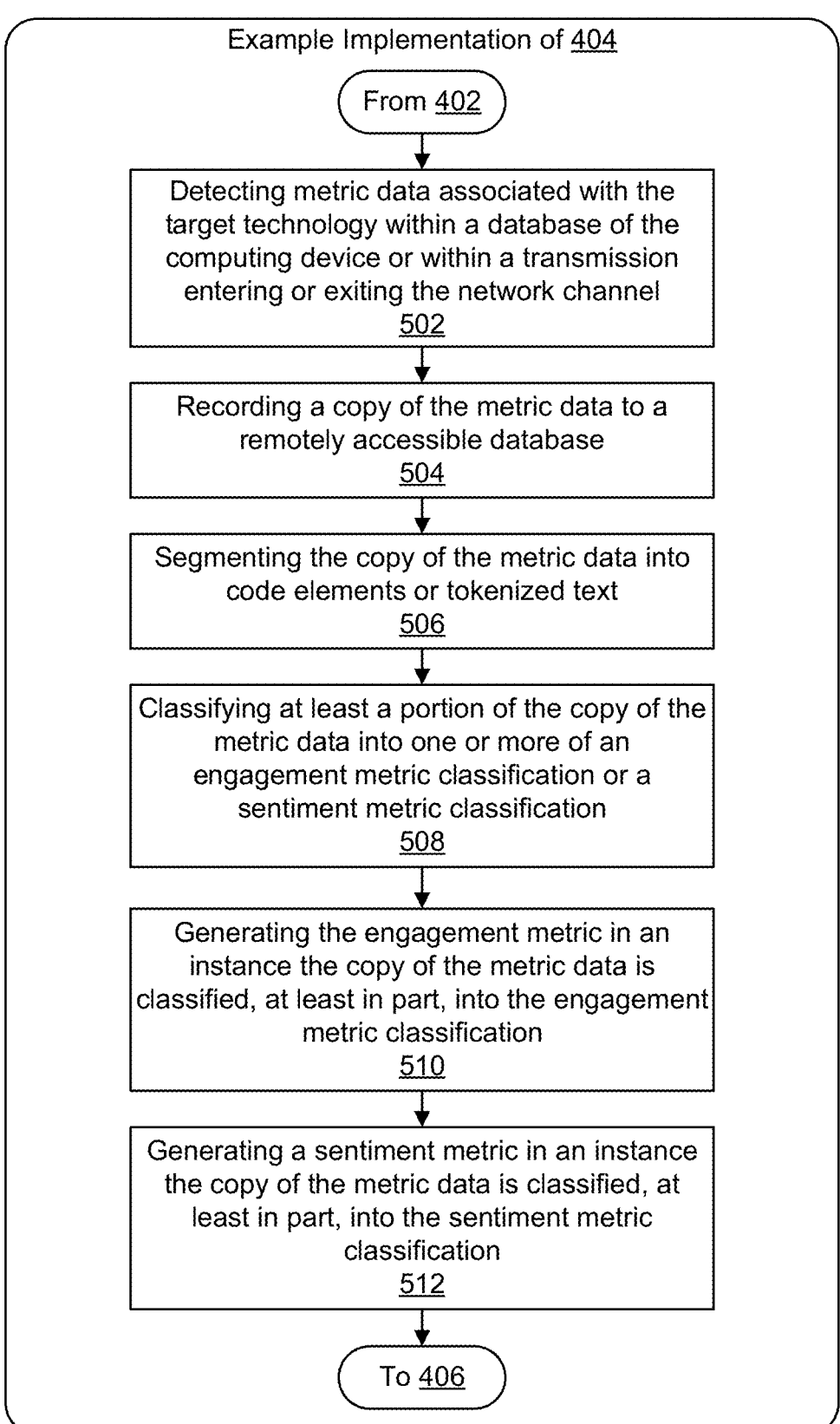

Example Implementation of 404

From 402

Detecting metric data associated with the target technology within a database of the computing device or within a transmission entering or exiting the network channel
502

Recording a copy of the metric data to a remotely accessible database
504

Segmenting the copy of the metric data into code elements or tokenized text
506

Classifying at least a portion of the copy of the metric data into one or more of an engagement metric classification or a sentiment metric classification
508

Generating the engagement metric in an instance the copy of the metric data is classified, at least in part, into the engagement metric classification
510

Generating a sentiment metric in an instance the copy of the metric data is classified, at least in part, into the sentiment metric classification
512

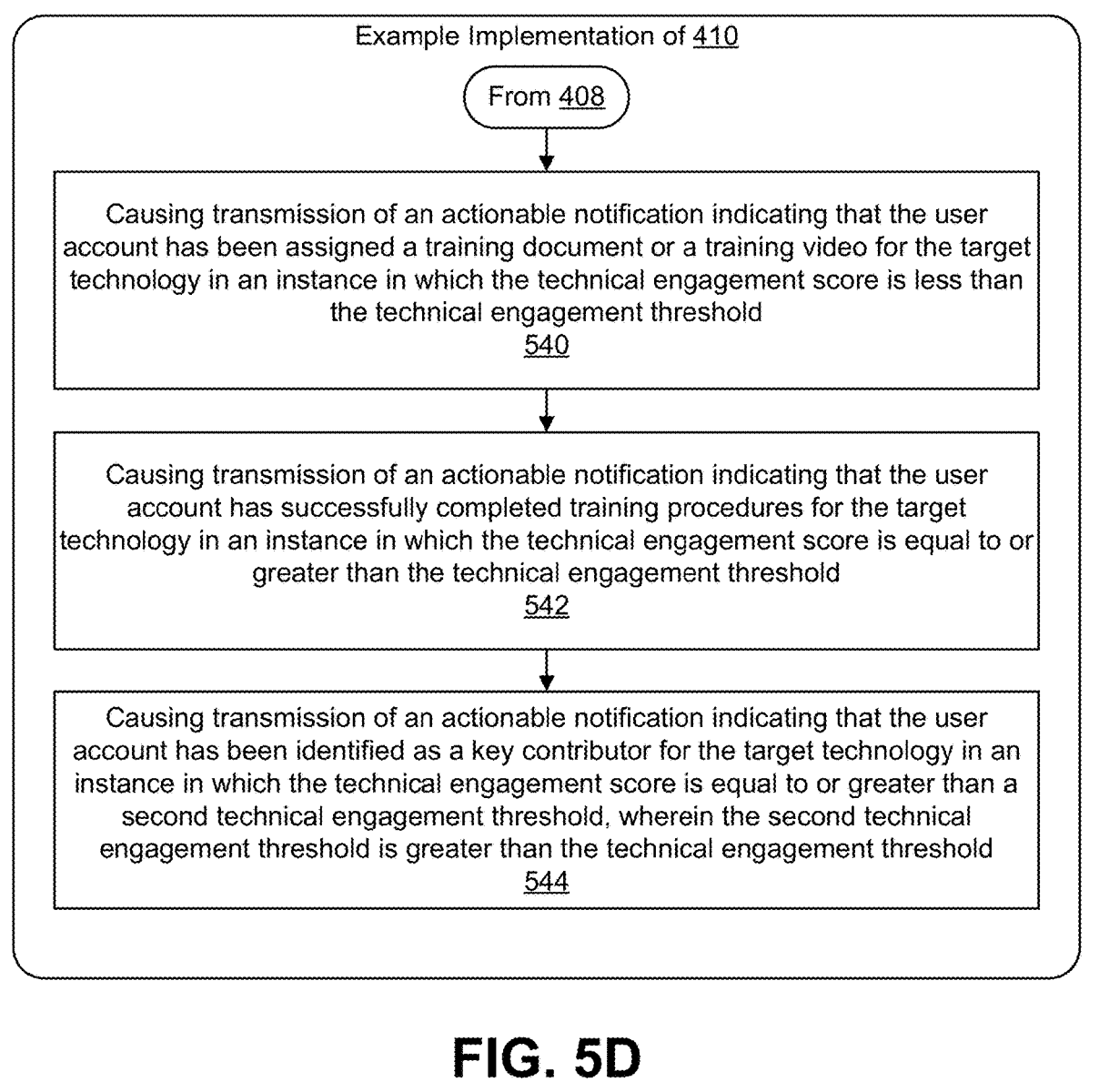

Example Implementation of <u>410</u>

From <u>408</u>

Causing transmission of an actionable notification indicating that the user account has been assigned a training document or a training video for the target technology in an instance in which the technical engagement score is less than the technical engagement threshold
<u>540</u>

Causing transmission of an actionable notification indicating that the user account has successfully completed training procedures for the target technology in an instance in which the technical engagement score is equal to or greater than the technical engagement threshold
<u>542</u>

Causing transmission of an actionable notification indicating that the user account has been identified as a key contributor for the target technology in an instance in which the technical engagement score is equal to or greater than a second technical engagement threshold, wherein the second technical engagement threshold is greater than the technical engagement threshold
<u>544</u>

FIG. 5D

SYSTEMS AND METHODS FOR TRACKING TECHNICAL ENGAGEMENT OF DIGITAL RESOURCES

BACKGROUND

Entities may utilize different hardware and software technologies to perform various activities across multiple departments (e.g., accounting, purchasing, sales, human resources, warehouse inventory, transportation, etc.). Some of these technologies may be specific to a particular department (e.g., a machine with proprietary software for manufacturing, etc.) and other technologies (e.g., word processors, email, etc.) may be utilized by the entire entity. Rolling out new technologies can be challenging due to a variety of factors (e.g., downtime, training requirements, availability of resources, etc.).

BRIEF SUMMARY

Implementing new technologies and consistently upgrading existing technologies can provide entities (e.g., banks, retailers, manufacturers, transportation companies, etc.) with a variety of benefits (e.g., more efficiency, less operating costs, greater online security, etc.) and in some cases is unavoidable. For example, existing software products may be discontinued or particular technologies (e.g., multi-factor authentication and/or a virtual private networks (VPNs) for remote workers) may be mandated by third-parties (e.g., governments, certification bodies, etc.). As a result, many entities have technology rollout teams tasked with the implementation of new technologies. The rollout team may be tasked with developing training materials, identifying users for training, and determining whether users have a sufficient understanding of the new technology to work successfully.

Traditionally, it has been difficult to objectively identify the most pertinent information to incorporate into digital training resources to limit the size and/or length of such resources to conform to specific computational limits. For example, because digital training resources are distributed electronically (e.g., streaming videos, file transfer protocol (FTP), email, etc.) user access may be limited by available computing resources (e.g., bandwidth, user licenses, email size limits, inbox storage limits, etc.) which, if overloaded, can slow or halt user training and the rollout of the new technology.

In addition, it has been difficult to objectively identify the most pertinent information to incorporate into digital training resources to meet specific user requirements. Conventional systems have had to rely on the subjective judgement of human team members (e.g., of the rollout team) to develop, measure, and update digital training resources for each new technology rollout. This problem is further compounded when a new technology is being rolled out across multiple departments. Each department may utilize the new technology for different purposes or include users of various technical ability (i.e., technical savviness, technical literacy, etc.). For example, when rolling out a new word processor the accounting department may need to be trained to import tables, or program equations, into a document. However, the human resources department may not utilize either of these features and instead may need to be trained to use redacting, or encryption tools, for a document to protect sensitive information.

Additionally, it has been difficult to objectively identify deficiencies (e.g., missing information, incorrect information, etc.) in digital training resources. Conventional systems have had to rely upon subjective human judgement to manually determine the effectiveness of digital training resources which can prevent deficiencies from being properly corrected. For instance, deficiencies in digital training resources (e.g., missing information, no examples, no images, etc.) may be improperly disregarded as a deficiency of the user (e.g., a lack of technical literacy, a failure to read the material or watch a video, etc.) and, thus, the actual problem is not corrected.

In addition, it has been difficult to objectively measure successful use of a new technology by users to determine if additional training is necessary. Again, conventional systems have had to rely upon subjective human judgement to manually determine if a user can successfully utilize a new technology, or if additional training is necessary, which can prevent users from being fully trained or, in contrast, over trained. For example, a user may appear to utilize a new technology under the supervision of a human team member, however, when left alone the user may fail to successfully perform their required tasks. In this manner, a human team member may be unknowingly assisting instead of only supervising the user. In such instances, the human team member may incorrectly judge that the user can successfully use the new technology and, thus, that additional training is not necessary.

It has also been difficult to objectively measure successful use of a new technology by users after training due to security limitations imposed by some departments. For example, human team members may lack the required governmental security clearance to observe a research and development (R&D) department after training on a new technology. As such, it may not be possible for conventional systems to properly determine whether each individual R&D member can successfully utilize the new technology. Post training review during a "go-live" period may be necessary to ensure that all individuals of a department are sufficiently able to utilize the new technology. For example, it may be discovered during the "go-live" period that more technically savvy users are completing tasks related to the new technology for less technically savvy users and, thus, it can be determined that additional training is required.

Additionally, it has been difficult to objectively and/or dynamically react to upgrades (e.g., software updates, adding additional hardware, etc.) to existing technologies. For example, seemingly routine or minor updates (e.g., moving features to new locations in a user interface, activating previously optional add-ons, etc.) may require additional follow-up training or updates to existing digital training resources. Conventional systems have lacked any dynamic or automated response mechanism to such situations and instead have had to rely on subjective human judgement to report and respond to such upgrades.

In contrast to these conventional techniques for implementing new technologies and upgrades, example embodiments described herein monitor and track the technical engagement of digital resources (e.g., user accounts, digital training resources, software, hardware, etc.) to provide multiple improvements not possible with conventional systems. As described herein, example embodiments may be locally or remotely deployed across an entity's computing infrastructure to monitor and track user account interactions with digital training resources (e.g., written documentation, recorded or live audio/video sessions, etc.). In addition, example embodiments may be able to dynamically target user account interactions specific to utilizing the target technology (e.g., inputting data into a software, authorizing an update, using a pin to activate hardware, etc.) being rolled out. These and other user account interactions may then be recorded in a standardized format and used to provide a technical engagement score associated with the user account. This technical engagement score may be used to objectively identify user accounts to facilitate further actions, such as, assigning additional training, approving completion of specific requirements, or requesting a contribution to digital training resources (e.g., forum posts, training documents, audio/video sessions, etc.) from the user account. Moreover, example embodiments may leverage machine learning technology to, among other things, objectively identify deficiencies in digital training resources (e.g., training documents, training videos, etc.) and alert an administrator account of such deficiencies and/or dynamically remedy such deficiencies (e.g., by linking to another document or video).

Accordingly, the present disclosure sets forth systems, methods, and apparatuses that provide improved monitoring and tracking for a rollout of a new technology. There are many advantages of these and other embodiments described herein over the conventional systems described above.

One advantage is that example embodiments provide an improvement to the functioning of the computing infrastructure of an entity by reducing the burden on computing resources. Example embodiments may accomplish this by targeting the most pertinent information for digital training resources to limit the size and/or length of such resources to conform to specific computational limits. Example embodiments may receive predefined data size and/or length requirements (e.g., based on streaming server bandwidth, remote database storage size, email limits, etc.) for generating digital training resources. Thus, example embodiments can reduce the burden on the available computing infrastructure associated with transferring and storing digital training resources which reduces the likelihood of technical problems (e.g., a server crash, undeliverable emails, etc.)

Another advantage is that example embodiments provide an improvement to implementation system technologies and/or document management and storage technologies by targeting pertinent information for digital training resources. Example embodiments may dynamically and objectively develop training materials that target pertinent information by leveraging machine learning technologies (e.g., chatbots, neural networks, clustering analysis, etc.) deployed to, or working in conjunction with, an entity's computing infrastructure. For example, digital training resources, or the like, can be automatically generated based on data mined from user accounts (e.g., emails, group chats, etc.) that only includes topics related to tasks previously and/or regularly discussed (e.g., daily, weekly, monthly, yearly, etc.) by the user accounts. In this manner, machine learning technologies can select topics for inclusion in training documents based on objective metrics and not based on, or influenced by, human subjectivity, persuasion, and/or coercion. For example, human team members may feel pressured to include information requested by senior users (e.g., managers, supervisors, etc.) that is not pertinent for training the average user.

Still another advantage to automatically generating digital training resources with machine learning based on data mined from user accounts is that digital training resources can be tailored to department and/or job specific requirements. For example, accounting specific digital training resources for a new word processor software can be generated to include information on importing tables and programing equations into a document, while excluding information only required by the human resources department (e.g., redacting or encrypting a document). Still other department and/or job specific digital training resources may be generated.

Another advantage is that example embodiments provide an improvement to implementation system technologies and/or document management and storage technologies by objectively identifying deficiencies and/or errors of digital training resources. For instance, deficiencies can be objectively identified in digital training resources by leveraging machine learning technologies, data mining, and statistical analysis techniques. For example, a pattern may be identified that a majority of user accounts (e.g., 85%, etc.) that watch a particular video have further accessed a particular document within a specific time period (e.g., 48 hours, etc.) after completing the video. The transcript of the video may be compared (e.g., by a neural network, chatbot, etc.) to the document to determine which data in the document is absent from the video. This data may then be automatically added to the video (e.g., as a pop-up, end of video slide, via a hyperlink, etc.) to remedy the deficiency of the video.

Another advantage is that example embodiments provide an improvement to implementation system technologies and/or document management and storage technologies by remotely and securely monitoring sensitive information. As described herein, example embodiments reduce the need to introduce another human team member (e.g., which may require lengthy and costly background checks, introduce additional security risks, etc.) and/or additional technical vulnerabilities into secured areas or secured computer systems. For instance, example embodiments can be deployed to monitor departments with sensitive information (e.g., an R&D department, etc.) without the need for additional security clearance requirements that would be required of a human team member. In addition, example embodiments may be deployed with encryption protocols and/or other security features required to conform to the necessary security certifications. Moreover, example embodiments may be deployed locally (e.g., within a department's intranet, etc.) to reduce the need for outside network channels (e.g., to the Internet, etc.) which may increase vulnerability to cyberattacks. Example embodiments that can be locally deployed, as described herein, can reduce communications network vulnerabilities created by opening additional communications channels (e.g., additional open firewall ports, additional user accounts required by conventional systems, or the like) that can be targeted by cyber-attacks (e.g., malware, hackers, viruses, unpatched vulnerabilities, Distributed Denial-of-Service (DDoS) attacks, and/or the like) into a secured department and/or computing system.

Yet another advantage is that example embodiments provide an improvement to implementation system technologies and/or document management and storage technologies by identifying, in real-time or near-real-time, new technical problems caused by new updates or other upgrades. For instance, as automatic updates are applied to a newly introduced technology or across an entity's computing infrastructure as a whole (e.g., via Microsoft Update, Windows Update for Business, etc.) technical problems may occur or digital training resources may become, at least in part, obsolete. For example, an update to a newly introduced software may require an activation key to be input after the update and the affected user may not know where to locate the key because it was not previously addressed in the digital training resources. Example embodiments may identify this deficiency (e.g., in real-time or near-real-time via helpdesk incident tickets, helpdesk chatbot logs, emails, or the like) and generate, or update, a digital training resource to remedy the deficiency (e.g., a document explaining in plain language where to locate the key and how to enter the key to reactivate the software). Example embodiments may generate stand-alone software instructions to dynamically and/or automatically locate and input the key after future updates, e.g., for the affected users. Further, similar solutions may be applied to updates to user interfaces (e.g., that reorganize familiar icon locations, etc.) or when a security update cuts off access to a particular feature, web service, or a network file location.

Moreover, it should be appreciated that such example embodiments as set forth herein solve particular problems identified and described above for conventional implementation system technologies and/or document management and storage technologies.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 4 illustrates an example flowchart for monitoring and/or tracking technical engagement of digital resources, in accordance with some example embodiments described herein.

FIG. 5A illustrates an example flowchart for classifying metric data, in accordance with some example embodiments described herein.

FIG. 5D illustrates an example flowchart for initializing an actionable instruction set based on a technical engagement score, in accordance with some example embodiments described herein.

DETAILED DESCRIPTION

Figure 1:
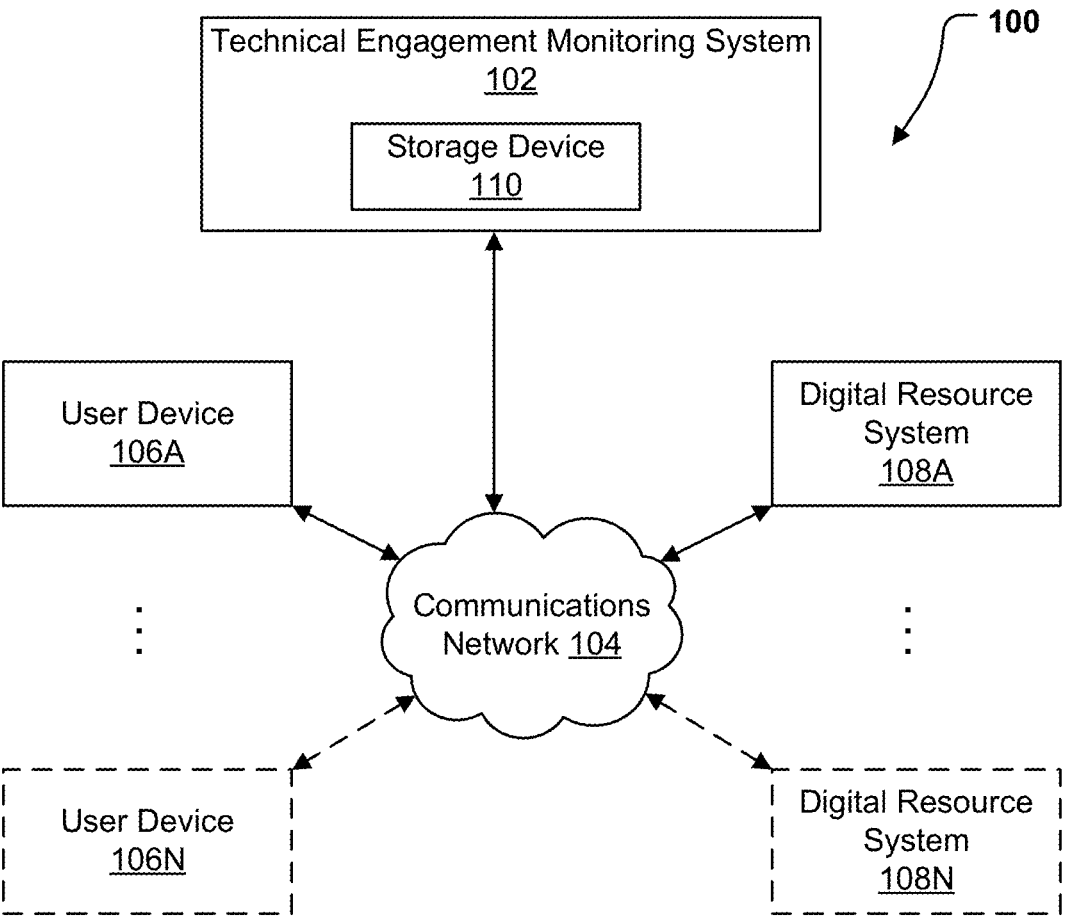
FIG. 1 illustrates a system in which some example embodiments may be used incorporating a technical engagement monitoring system.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "digital resource" refers to any hardware, software, firmware, file, data, data object, data structure, a component thereof, and/or the like that is part of, or available for use in conjunction with, an entity's computing infrastructure. Example digital resources may include, without limitation, user accounts (e.g., email addresses, network logins, etc.) associated with members of an entity (e.g., employees, contractors, etc.), digital training resources (as described below), a software application (e.g., email client, instant messenger, etc.), data output by software applications, a website, a web service, and/or the like. Further, digital resources may include, without limitation, any equipment and/or hardware that utilizes a software and/or firmware component, such as printers, scanners, Voice over Internet Protocol (VoIP) phones, cellular phones, storage devices, and/or any other types of specialized equipment (e.g., manufacturing, packaging, medical, transportation equipment, etc.). Any digital resource comprising equipment and/or hardware may be, at least temporarily, directly connected (e.g., via a wired or wireless connection) or indirectly connected (e.g., via the Internet, mobile network, router, relay, modem, and/or the like) to an entity's computing infrastructure.

The term "digital training resource" refers to any electronic document, video recording, audio recording, software tutorial, software simulation, a component thereof, and/or any other digital resource (as described above) to facilitate technical learning that is part of, or available for use in conjunction with, an entity's computing infrastructure. Example digital resources may include, without limitation, a Portable Document Format (PDF) file, an MPEG-4 file, a digital copy of a flowchart, a digital copy of a user manual, a website (e.g., providing instructions, guides, etc.), and/or the like.

The term "engagement metric" refers to any directly or indirectly measurable interaction between two or more digital resources. Example engagement metrics may include, without limitation, data transmitted and/or received between a user account and a target technology, data transmitted and/or received between a target technology and another technology, an actionable instruction set executed by a user account and/or another technology in response to an actionable instruction set executed by a target technology, an incident ticket generated for a user account and/or a target technology, a request to access digital training resources, a number of times or a time period the user account utilized the target technology, a number of times or a time period the user account accessed a training document or a training video for the target technology, a digital communication (e.g., email, chat, forum post, etc.) from a user account requesting assistance, errors made by a user account (e.g., in a software, etc.), a length of time to generate an output or complete a task with a target technology, historical data from previous rollouts, a time in a document or watching a video based on user interface focus of a user device (e.g., tab focus of a browser, etc.), and/or the like as described herein. In some embodiments, a data object may represent an engagement metric as described herein.

The term "sentiment metric" refers to any engagement metric representative of a sentiment of a user of a user account. Example sentiment metrics may include, without limitation, a rating or a review generated by a user account (e.g., after interacting with a digital resource, etc.), a digital communication (e.g., feedback survey, email, chat, forum post, etc.) expressing a sentiment for a digital resource, notes provided in an incident ticket of helpdesk application generated for a user account, text data representative of an emotion and/or opinion of a user of a user account, and/or the like as described herein. In some embodiments, a sentiment metric may be representative of a user satisfaction level associated with utilizing a digital resource (e.g., target technology, etc.). In some embodiments, a data object may represent a sentiment metric as described herein.

The term "target technology" refers to any digital resource that is being monitored and/or tracked on, and/or in conjunction with, an entity's computing infrastructure. Example target technologies may include, without limitation, hardware, software, firmware, updates, patches, add-ons, plug-ins, and/or the like as described herein. Further, specific versions, or components, of a digital resource may be a target technology while other versions, or components, of the same (or a substantially similar) digital resource may not be characterized as the target technology. For example, an entity's computing infrastructure may have included v2.0 of a software for several years and now v2.1 of the software is being rolled out. In this manner, v2.0 and v2.1 may be employed during overlapping time periods on the same computing infrastructure, however, v2.1 may be the target technology for monitoring while v2.0 may not be a target technology for systems and methods of monitoring as described herein. In some embodiments, new hardware models may be employed with older hardware models during overlapping time periods on the computing infrastructure, however, new hardware models may be the target technology for monitoring while older hardware models may not be a target technology for systems and methods of monitoring as described herein.

The term "actionable instruction set" refers to any computer-readable code, software instruction, or the like as described herein that can be executed by a processor and/or other hardware components to cause a particular outcome. Example actionable instruction sets may include, without limitation, any computer-readable code, software instruction, or the like for generating data, updating data, deleting data, transmitting data, causing hardware to perform a task, causing a printer to print, causing a scanner to scan, causing a phone to connect or disconnect a phone call, causing transmission of an email, causing transmission of a text message, rendering a graphical user interface, rendering human language on a display, requesting information (e.g., from a user via a user interface, from a software application, from a web service, etc.), retrieving data (e.g., from a remote database, etc.), write data to memory (e.g., a hard drive, etc.), causing a particular machine (e.g., manufacturing equipment, packaging equipment, location tracking circuitry, etc.) to perform a particular task (e.g., 3D print a part, engrave a material, assemble a box, send and/or receive location data, etc.), performing a combination thereof, or performing any other operations as described herein.

System Architecture

Example embodiments described herein may be implemented using any of a variety of computing devices or servers. To this end, FIG. 1 illustrates an example environment 100 within which various embodiments may operate. As illustrated, a technical engagement monitoring system 102 may receive and/or transmit information via communications network 104 (e.g., the Internet, an intranet, a mobile network, etc.) with any number of other devices, such as one or more of user devices 106A-106N and/or digital resource systems 108A-108N.

The technical engagement monitoring system 102 may be implemented as one or more computing devices or servers, which may be composed of a series of components. Particular components of the technical engagement monitoring system 102 are described in greater detail below with reference to apparatus 200 in connection with FIG. 2.

In some embodiments, the technical engagement monitoring system 102 further includes a storage device 110 that comprises a distinct component from other components of the technical engagement monitoring system 102. Storage device 110 may be embodied as one or more Direct-Attached Storage (DAS) devices (such as hard drives, solid-state drives, optical disc drives, or the like) or may alternatively comprise one or more Network Attached Storage (NAS) devices independently connected to a communications network (e.g., communications network 104). Storage device 110 may host the software executed to operate the technical engagement monitoring system 102. Storage device 110 may store information relied upon during operation of the technical engagement monitoring system 102, such as digital resources, metric data, name-value pair data that may be used by the technical engagement monitoring system 102, data and documents to be analyzed using the technical engagement monitoring system 102, or the like. In addition, storage device 110 may store control signals, device characteristics, and access credentials enabling interaction between the technical engagement monitoring system 102 and one or more of the user devices 106A-106N and/or digital resource systems 108A-108N.

The one or more user devices 106A-106N and the one or more digital resource systems 108A-108N may be embodied by any computing devices described herein. The one or more user devices 106A-106N and the one or more digital resource systems 108A-108N need not themselves be independent devices, but may be peripheral devices communicatively coupled to other computing devices.

Although FIG. 1 illustrates an environment and implementation in which the technical engagement monitoring system 102 interacts indirectly with a user via one or more of user devices 106A-106N and/or digital resource systems 108A-108N, in some embodiments users may directly interact with the technical engagement monitoring system 102 (e.g., via communications hardware of the technical engagement monitoring system 102), in which case one or more separate user devices 106A-106N and/or digital resource systems 108A-108N may not be utilized. Whether by way of direct interaction or indirect interaction via another device, a user may communicate with, operate, control, modify, or otherwise interact with the technical engagement monitoring system 102 to perform the various functions and achieve the various benefits described herein.

Example Implementing Apparatuses

Figure 2:
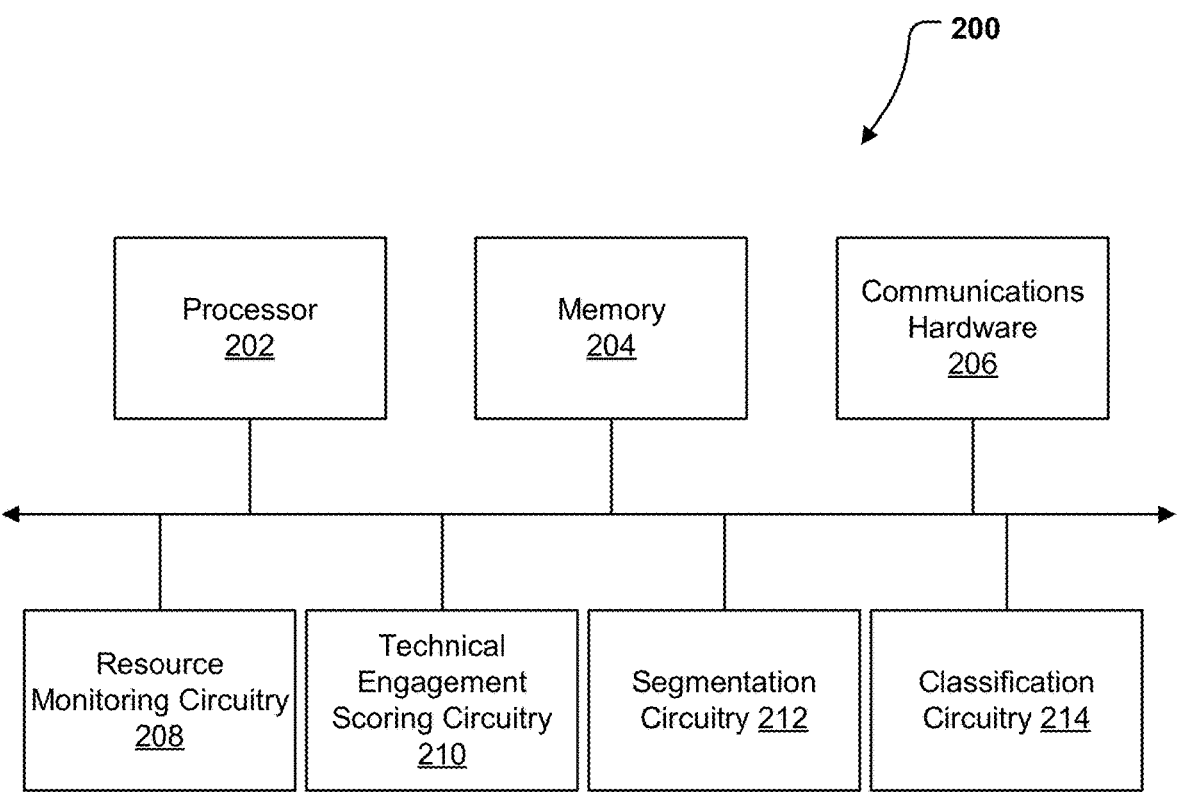
FIG. 2 illustrates a schematic block diagram of example circuitry embodying a system device that may perform various operations in accordance with some example embodiments described herein.

The technical engagement monitoring system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 4 and 5A-5E. As illustrated in FIG. 2, the apparatus 200 may include processor 202, memory 204, communications hardware 206, resource monitoring circuitry 208, technical engagement scoring circuitry 210, segmentation circuitry 212, and classification circuitry 214, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises resource monitoring circuitry 208 that monitors and tracks metric data associated with a target technology (e.g., software, hardware, etc.) associated with a new technology rollout for an entity (e.g., bank, retailer, manufacturer, etc.). The resource monitoring circuitry 208 may utilize processor 202, memory 204, or any other hardware component included in the apparatus 200 to perform these operations, as described in connection with FIGS. 4 and 5A-5E below. The resource monitoring circuitry 208 may further utilize communications hardware 206 to gather data from a variety of sources (e.g., network channels of communications network 104, storage device 110, user devices 106A-106N, digital resource systems 108A-108N, or the like, as shown in FIG. 1), and/or exchange data with a user, and in some embodiments may utilize processor 202 and/or memory 204 to deploy a machine learning monitoring application to a computing environment comprising one or more of a computing device or a network channel, wherein the network channel comprises one or more of a wired network communication channel or a wireless network communication channel. For example, the resource monitoring circuitry 208 may download, or upload, a machine learning monitoring application to an entity's computing infrastructure (or component thereof) comprising one or more of a server, personal computer, router, modem, databases, and/or the like as described herein. In some embodiments, the machine learning monitoring application may be a program installed at a centralized server that monitors communication channels between user devices 106A-106N, digital resource systems 108A-108N, and/or the like. In some embodiments, the machine learning monitoring application may be installed on individual user devices (e.g., any of user devices 106A-106N) and/or servers or other computing devices supporting digital resources (e.g., any of digital resource systems 108A-108N). The machine learning monitoring application may comprise one or more web services, bots, neural networks, or other software programs as described herein.

Moreover, the resource monitoring circuitry 208 may leverage the deployed machine learning monitoring application to detect metric data (e.g., engagement or sentiment metric data objects, keywords, etc.) associated with a target technology of a new technology rollout. For example, the resource monitoring circuitry 208 may leverage a predefined list, table, and/or database of keywords, phrases, code elements, code tags, metadata, and/or the like to detect metric data in communications network traffic (e.g., via network channels of communications network 104) associated with the target technology. Further, the resource monitoring circuitry 208 may leverage a predefined list, table, and/or database of keywords, phrases, code elements, code tags, metadata, and/or the like to scan databases, files, or the like (e.g., stored on user devices 106A-106N, digital resource systems 108A-108N, or the like) to detect metric data associated with the target technology. In some embodiments, the new technology rollout may comprise the installation of a plurality of new hardware, software, and/or the like. In some embodiments, the resource monitoring circuitry 208 may be configured (e.g., by user inputs, etc.) to target a particular subset of the new technology rollout. For example, the resource monitoring circuitry 208 may target (e.g., detect, scan for, etc.) metric data associated with a particular software application (e.g., a word processor, etc.) while ignoring (e.g., not acting in response to) other technologies of the new technology rollout (e.g., an antivirus application, etc.). In this manner, the resource monitoring circuitry 208 may target data associated with a target technology (e.g., the word processor). In some embodiments, a target technology may be any technologies of the new technology rollout that are utilized by users (e.g., human employees) to perform their job directly, indirectly, and/or on a regular basis. A word processor, for example, may be used daily by users directly as they create documents while an antivirus application may run in the background of the computing environment with little or no need for direct user interaction. The target technology may be defined (e.g., by a user input) as any hardware, software, firmware, or the like as described above. One advantage to targeting particular technologies and not all aspects of the new technology rollout is that less digital resources need to be monitored and tracked and, thus, the computational resource burden placed on the computing infrastructure is reduced. Another advantage to targeting particular technologies is that the resource monitoring circuitry 208 may distinguish between technologies of the new technology rollout and other changes or updates due to regular maintenance of the computing environment (e.g., installation of a new printer to replace a broken printer, updates or patches to existing software, etc.). In some embodiments, the resource monitoring circuitry 208 may generate one or more name-value pair data objects representative of one or more of an engagement metric, a sentiment metric, a user account, a timestamp token, and/or other data objects as described herein. In some embodiments, the resource monitoring circuitry 208 may leverage a database and/or storage device (e.g., storage device 110, cloud storage, etc.) to record a copy of any metric data detected (e.g., in network traffic, on a computing device, etc.).

In some embodiments, the resource monitoring circuitry 208 may train, or re-train, a neural network (e.g., a supervised artificial neural network). In this manner, the resource monitoring circuitry 208 may retrieve (e.g., from a database) one or more data sets (e.g., training data, historical data, user inputs, or the like as described in further detail below in connection with FIGS. 4 and 5A-5E) comprising one or more of a code element, tokenized text, or the like representative of the target technology. Further, the resource monitoring circuitry 208 may leverage the segmentation circuitry 212 to segment the data sets into a plurality of training data sets (as described in further detail below in connection with the segmentation circuitry 212). Further, the resource monitoring circuitry 208 may propagate a first training data set of the plurality of training data sets forward through the neural network (i.e., feed the input data into the inputs nodes of the input layer) to generate a first output (e.g., representative of a detection of metric data associated with the target technology and the user account of the computing environment). Furthermore, the resource monitoring circuitry 208 may determine a first error between the first output of the neural network and the predefined data set. In some embodiments, the predefined data set, or other training data, may be categorized with metadata, or the like, indicating which outputs should be assigned by the neural network. The first error may be probability of accuracy associated with the output (e.g., 0.75 or 75% likelihood that the output is correct) or it may be a binary error (e.g., correct or incorrect based on comparison to a known result). The resource monitoring circuitry 208 may further propagate a second training data set of the plurality of training data sets forward through the neural network to generate a second output (e.g., representative of another detection of the metric data associated with the target technology and the user account of the computing environment). The resource monitoring circuitry 208 may further determine a second error (e.g., between the second output of the neural network and the predefined data set). The resource monitoring circuitry 208 may adjust one or more parameters or weighted values (e.g., for one or more nodes) of the neural network and repeat the propagation of the second training data set through the neural network until the second error is less than the first error. For example, if the first error indicates a 75% likelihood of a correct output (i.e., a 25% likelihood of an incorrect output) then the second error would be determined to be less than the first error if the second error indicates a 76% (or greater) likelihood of a correct output (i.e., a 24% (or lower) likelihood of an incorrect output). Further, if the first error is a binary error indicating an incorrect output then the second error would be determined to be less than the first error if the second error is a binary error indicating a correct output. In some embodiments, the second error may be compared to a neural network acceptable error threshold (e.g., instead of to a first error). In some embodiments, training, and/or retraining, a neural network may be performed in response to a user input and/or dynamically in response to additional keywords, phrases, code elements, code tags, and/or the like being detected (e.g., via a pattern of specific keywords, or the like, used in user account communications associated with the target technology, such as emails) during operation of the technical engagement monitoring system 102.

In some embodiments, the resource monitoring circuitry 208 may determine that a particular task has, at least in part, been performed in association with a user account and a target technology. The resource monitoring circuitry 208 may identify a task associated with the target technology based on one or more of execution of software instructions, generation of a data object (e.g., output file from targeted software), location data indicating a user device is proximate an operator's position for hardware (as described below), or through the detection of metric data or the like as described herein. In some embodiments, the resource monitoring circuitry 208 may determine an average completion time for a task based on a plurality of user accounts that have successfully completed the task and/or based on an average completion time defined by a user input. In some embodiments, the resource monitoring circuitry 208 may determine a standard deviation completion time based, at least in part, on the average completion time based, at least in part, on a plurality of user accounts that have successfully completed the task and/or based, at least in part, on a standard deviation completion time defined by a user input. In some embodiments, the resource monitoring circuitry 208 may determine that a particular user account has completed a task based, at least in part, on name-value pair data.

In some embodiments, the resource monitoring circuitry 208 may identify a deficiency in a digital training resource. In some embodiments, the resource monitoring circuitry 208 may identify a digital training resource (e.g., training document, training video, etc.) associated with a target technology and/or accessed by a user account. In some embodiments, the digital training resource may be identified based, at least in part, on detection of information associated with an engagement metric data object, sentiment metric data object, and/or the like. Further, the resource monitoring circuitry 208 may determine a user satisfaction level associated with the user account that utilized the digital training resource (e.g., training document, training video, etc.). In some embodiments, the user satisfaction level may be determined based, at least in part, on a sentiment metric data object, survey, rating, review, or the like associated with a user account. In some embodiments, the resource monitoring circuitry 208 may determine that a user satisfaction level associated with a user account utilizing the digital training resource is less than a satisfaction level threshold. The satisfaction level threshold may be one or more values, or ranges of values, defined by a user input. For example, an administrator user may define a scale for rating user satisfaction from 0% to 100% comprising a first range from 0% to 65% as unhappy, a second range from 65% to 89% as satisfactory, and a third range from 90% to 100% as happy (e.g., with the target technology and/or a particular experience with the target technology). In some embodiments, in response to determining that the user satisfaction level is less than the satisfaction level threshold, the resource monitoring circuitry 208 may update the digital training resource to include additional information from, or a link to, another digital training resource (e.g., another training document, training video, etc.). Further, the resource monitoring circuitry 208 may leverage the communications hardware 206 to cause transmission of an alert notification (e.g., to an administrator user, a user account, etc.) identifying one or more of the digital training resource, the user satisfaction level, a training resource deficiency, or other information related to remedying a deficiency, or error, of a digital training resource.

In addition, the apparatus 200 further comprises technical engagement scoring circuitry 210 that score user accounts and/or digital training resources based, at least in part, on analyzed metric data. The technical engagement scoring circuitry 210 may utilize processor 202, memory 204, or any other hardware component included in the apparatus 200 to perform these operations, as described in connection with FIGS. 4 and 5A-5E below. The technical engagement scoring circuitry 210 may further utilize communications hardware 206 to gather data from a variety of sources (e.g., storage device 110, user devices 106A-106N, digital resource systems 108A-108N, or the like, as shown in FIG.

1), and/or exchange data with a user, and in some embodiments may utilize processor 202 and/or memory 204 to generate a technical engagement score representative of a probability of a successful utilization of the target technology by a user account. The technical engagement scoring circuitry 210 may receive, retrieve, and/or access name-value pair data (e.g., from storage device 110, etc.) that is representative of one or more of an engagement metric, a sentiment metric, a user account, a timestamp token, or the like. The timestamp token may comprise data representative of a time of an interaction between the user account and the target technology (e.g., completion of a task, etc.) or a time when a sentiment was expressed (e.g., when a review was posted, etc.). The technical engagement scoring circuitry 210 may compare the name-value pair data (e.g., an engagement metric, a sentiment metric, or the like) to a predefined list, table, database, and/or the like of keywords, phrases, and/or the like associated with one or more statistical relationships between the keywords, phrases, and/or the like and a probability, or likelihood, of (i) a successful utilization of the target technology by a user account (e.g., successful completion of a task, filled out a digital form completely, etc.), and/or (ii) that a digital training resource contains sufficient information to train a user of a user account to successfully utilize, at least in part, the target technology.

In some embodiments, the technical engagement scoring circuitry 210 may generate an initial, or base, technical engagement score based, at least in part, on first name-value pair data or based, at least in part, on a default initial score (e.g., a base score of 0.00 or 0%). Further, the technical engagement scoring circuitry 210 may update the technical engagement score for a user account based, at least in part, on second name-value pair data. For example, the technical engagement scoring circuitry 210 may generate an initial technical engagement score (e.g., 0.75 or 75%) based on name-value pair data representative of an engagement metric (e.g., completion of a task, etc.) and the technical engagement scoring circuitry 210 may generate an updated technical engagement score (e.g., 0.68 or 68%) based on other name-value pair data representative of a sentiment metric (e.g., indicating that the user is not comfortable with all variations of a process for completing a task, etc.). In some embodiments, the technical engagement scoring circuitry 210 may compare a technical engagement score to a technical engagement threshold (e.g., to determine if the user account should be assigned more training, granted/denied access to additional digital training resources, granted/denied access to use the target technology, etc.). The technical engagement threshold may be, e.g., a minimum score required to pass training and/or activate security credentials of a user account (e.g., password, login, etc.) to utilize the target technology (e.g., outside of training, without supervision, with additional features activated/deactivated, etc.).

In some embodiments, the technical engagement scoring circuitry 210 may increase a technical engagement score in an instance in which the user account of the name-value pair data has successfully completed the task within a standard deviation completion time threshold. In some embodiments, the technical engagement scoring circuitry 210 may decrease a technical engagement score in an instance in which the user account of the name-value pair data has successfully completed the task outside of the standard deviation completion time threshold. In some embodiments, the technical engagement scoring circuitry 210 may decrease a technical engagement score in an instance in which the user account of the name-value pair data has unsuccessfully completed the task (e.g., failed to complete a fillable digital form, failed to generate an output data object, etc.).

In some embodiments, the technical engagement scoring circuitry 210 may be granted administrator functions (e.g., security access, etc.) associated with a computing environment (e.g., monitored by the resource monitoring circuitry 208, a particular remote server and/or local user device, etc.) to initialize an actionable instruction set (e.g., execute program code, or the like) based on a technical engagement score (e.g., compared to one or more technical engagement threshold). In some embodiments, the technical engagement scoring circuitry 210 may leverage the communications hardware 206 to cause transmission of an actionable notification (e.g., email with a link, digital calendar invitation, instant message from a chatbot, or the like). The actionable notification may indicate that the user account has been assigned additional digital training resources, e.g., a training document and/or a training video for the target technology that needs to be reviewed within a predefined period of time. For example, in an instance in which the technical engagement score assigned to a user account is less than a technical engagement threshold the technical engagement scoring circuitry 210 may email the user account a link to a video with a set of questions (e.g., a quiz, test, etc.) with a message comprising instructions that the video must be watched to 100% completion and that the set of questions must be answered with an accuracy of 70% or greater within the next 24 hours. Further, the user account may lose access to a target technology (e.g., login or password for a new software may be deactivated) in an instance in which the user account does not meet the requirements of the email. In some embodiments, a chatbot comprising a neural network, and/or the like, may provide additional digital training resources via a chat window (e.g., written text, a video, links, etc.) and provide questions to the user account through a progressive user interface (e.g., a set of real-time, or near-real-time, instant messages between the chat bot and the user account).

In some embodiments, the actionable notification may indicate that the user account has successfully completed the training procedures, and/or requirements, associated a target technology, e.g., in an instance in which the technical engagement score is equal to, or greater than, the technical engagement threshold. For example, the technical engagement scoring circuitry 210 may email the user account a link to setup and/or activate security credentials of a user account (e.g., password, login, etc.) to utilize the target technology (e.g., outside of training, without supervision, with additional features activated, etc.). In some embodiments, a chatbot comprising a neural network, and/or the like, may facilitate setup and/or activation of security credentials for a user account via a chat window (e.g., written text, links, fillable forms, etc.) through a progressive user interface (e.g., a set of real-time, or near-real-time, instant messages between the chat bot and the user account). In some embodiments, the progressive user interface may provide additional digital training resources (as described above) to a user account and, in response to successfully completing the training procedures, and/or requirements, the progressive user interface may facilitate setup and/or activation of security credentials for a user account.

In some embodiments, the actionable notification may indicate that the user account has been identified as a key contributor for the target technology, e.g., in an instance in which one or more technical engagement scores of the user account are equal to, or greater than, a second technical engagement threshold. In some embodiments, two or more technical engagement scores may be applied to a user account. For example, a first technical engagement scores of a user account may represent engagement with a hardware component of a target technology and a second technical engagement scores of the user account may represent engagement with a software component of the target technology. In some embodiments, the two or more technical engagement scores may be representative of a user account's engagement with each respective target technology of a rollout. In some embodiments, the two or more technical engagement scores may be combined (e.g., based, at least in part, on weighted values) to form an aggregate technical engagement score for a user account.

The second technical engagement threshold (e.g., used to identify key contributors as described above) may be greater than a first technical engagement threshold (e.g., used to identify completion of training procedures and/or requirements). In some embodiments, a key contributor may be a user account that has completed training procedures and/or requirements for a target technology with an above average technical engagement score (e.g., one or more standard deviations above the average technical engagement score of a plurality of user accounts). In some embodiments, a key contributor may be a user account that has provided answers to questions associated with target technology (e.g., in group chats, emails, or the like). In some embodiments, a key contributor may be a user account that has generated one or more digital training resources (e.g., posted a training video, written a training document, etc.). In an instance in which a user account has been identified as a key contributor for a target technology, the technical engagement scoring circuitry 210 may provide the user account with an actionable notification requesting a user input to supervise one or more aspects of the technical engagement monitoring system 102. For example, a user account that has been identified as a key contributor may provide user inputs in response to one or more outputs of a neural network. The provided user inputs may be used as training data to train a neural network, e.g., as described above with reference to the resource monitoring circuitry 208. The provided user inputs may be provided by a user device (e.g., any of user devices 106A-106N) local to a user of the user account and then stored remotely in a database (e.g., of digital resource systems 108A-108N, of storage device 110, or the like). In some embodiments, the technical engagement scoring circuitry 210 may leverage the classification circuitry 214 to transform the provided user inputs from a non-standardized format (e.g., free-form text or unstructured text entered by a user) into a standardized format (e.g., name-value pair data, arrays, or other data objects or data structures with a particular format) predefined, or dynamically defined, by the technical engagement monitoring system 102 or a component thereof (e.g., a neural network, other machine learning application or algorithm, database, or the like).

In addition, the apparatus 200 further comprises segmentation circuitry 212 that identifies and segments or parses data (e.g., metric data, etc.) into subcomponents of the data (e.g., code elements, tokenized text, etc.). The segmentation circuitry 212 may utilize processor 202, memory 204, or any other hardware component included in the apparatus 200 to perform these operations, as described in connection with FIGS. 4 and 5A-5E below. The segmentation circuitry 212 may further utilize communications hardware 206 to gather data from a variety of sources (e.g., storage device 110, user devices 106A-106N, digital resource systems 108A-108N, or the like, as shown in FIG. 1), and/or exchange data with a user, and in some embodiments may utilize processor 202 and/or memory 204 to retrieve or access metric data, a copy of metric data, or a predefined data set (e.g., training data, etc.) recorded to a database (e.g., remotely accessible cloud database, etc.). In some embodiments, the segmentation circuitry 212 may utilize processor 202 and/or memory 204 to segment metric data, or the like, into code elements, tokenized text, other portions of the metric data, and/or the like. In some embodiments, the segmentation circuitry 212 may utilize processor 202 and/or memory 204 to segment a predefined data set (e.g., training data set, historical data set from a previous rollout, etc.) into a plurality of training data sets comprising, for example, an equal number of code elements, tokenized text, or the like. In some embodiments, the plurality of training data sets may comprise an unequal number of code elements, tokenized text, or the like. In some embodiments, each of the plurality of training data may be compiled with particular data to train a particular hardware component included in the apparatus 200 and/or the apparatus 300.

In addition, the segmentation circuitry 212 may utilize or leverage one or more machine learning techniques comprising one or more of a supervised and/or unsupervised artificial neural network (e.g., a feedforward artificial neural network, probabilistic artificial neural network, perceptron, multilayer perceptron, etc.), Naive Bayes classifier, decision tree, executable neural semantic parser, or other algorithms (e.g., parsers, tokenizers, etc.). For example, the segmentation circuitry 212 may utilize or leverage tokenizers and/or other Natural Language Processing (NLP) techniques as described herein to segment larger data structures (e.g., text, audio, etc.) comprising human language (e.g., English, Italian, Japanese, etc.) into smaller portions (e.g., tokenized text including phrases, words, letters, numbers, symbols, etc.) that can be more easily stored and processed by other components of the technical engagement monitoring system 102 (e.g., classification circuitry 214, etc.). In some embodiments, a tokenizer may access, receive, and/or read a data object, or data structure, (e.g., email, forum post, etc.) comprising text. For example, an email may include the following text: "Hi everyone, I am very happy with the new software and printer packages. I use both daily. Best regards, Jane.Doe@email.com." The tokenizer may process this text and output a data object comprising, for example, ['happy.', 'new software.', 'printer.', 'use daily.', 'Jane.Doe@email.com.']. It should be understood, in this example, the tokenizer has identified a sentiment associated with a target technology, an engagement frequency associated with the target technology, and a user account associated with sentiment and engagement. In some embodiments, the tokenizer may tokenize all of the words and may leverage the classification circuitry 214 to identify keywords and further classify those keywords (as described further below). For example, the classification circuitry 214 may further analyze the tokenizer's output to generate a separate engagement metric data object comprising, for example, ['new software.', 'printer.', 'use daily.', 'Jane.Doe@email.com.'] and a separate sentiment metric data object comprising, for example, ['happy.', 'new software.', 'printer.', 'Jane.Doe@email.com.']. In some embodiments, the classification circuitry 214 may add a classification token to each respective data object (e.g., 'engagement.', 'sentiment.', or the like) (as described further below).

In some embodiments, the segmentation circuitry 212 and the classification circuitry 214 (as described below) may, individually or in combination, comprise a NLP pipeline for processing and/or analyzing human languages. In some embodiments, text and/or audio data can be utilized as an input for the NLP pipeline. The NLP pipeline may comprise receiving a text or audio data set (e.g., from storage device 110, etc.), segmenting the text or audio data set into smaller portions (e.g., tokenized text, keywords, data objects, etc.), classifying the smaller portions (e.g., engagement or sentiment metric classification, etc.), and generating one or more data objects comprising a summarization of a respective smaller portion of the larger text or audio data object. In some embodiments, a data object output by the NLP pipeline may comprise an array defining a classification (e.g., engagement, sentiment, etc.), a keyword or description (e.g., login, task type, unhappy, happy, etc.), and/or a weighted value (e.g., "0.85" to indicate an 85% likelihood a user is happy with a target technology, "0.56" to indicate a 56% likelihood a user has completed a task successfully, "5" to indicate a user account has logged in 5 times, etc.).

In addition, the apparatus 200 further comprises classification circuitry 214 that classifies code elements, tokenized text, other portions of metric data, and/or the like with one or more metric classifications. The classification circuitry 214 may utilize processor 202, memory 204, or any other hardware component included in the apparatus 200 to perform these operations, as described in connection with FIGS. 4 and 5A-5E below. The classification circuitry 214 may further utilize communications hardware 206 to gather data from a variety of sources (e.g., storage device 110, user devices 106A-106N, digital resource systems 108A-108N, or the like, as shown in FIG. 1), and/or exchange data with a user, and in some embodiments may utilize processor 202 and/or memory 204 to identify portions of metric data or the like with one or more metric classifications including an engagement metric classification or a sentiment metric classification. Further, in some embodiments the classification circuitry 214 may utilize processor 202 and/or memory 204 to generate one or more of an engagement metric and/or a sentiment metric data object comprising an identified portion of metric data (e.g. recorded to storage device 110, or the like) and one or more metric classifications. For example, the classification circuitry 214 may receive, retrieve, or access metric data comprising a software application log and identify all user accounts logged into a software application within the past 24 hours. The classification circuitry 214 may classify this metric data, in bulk or individually for each identified user account, with the engagement metric classification and generate an engagement metric data object for each identified user account. The classification circuitry 214 may generate code elements and/or tokenized text to indicate metric classifications (e.g., in name-value pair data, arrays, or other data objects or data structures). In some embodiments, the classification circuitry 214 may transform the input metric data from a non-standardized format (e.g., free-form text or unstructured text entered by a user) into a standardized format (e.g., name-value pair data, arrays, or other data objects or data structures with a particular format) predefined, or dynamically defined, by the technical engagement monitoring system 102 or a component thereof (e.g., a neural network, other machine learning application or algorithm, database, or the like). In some embodiments, classification circuitry 214 may facilitate filtering of the input metric data by skipping over (e.g., ignoring) portions of the metric data that do not conform to the current classification analysis parameters or that is not required to generate an engagement metric data object or the like (e.g., passwords, other sensitive information, etc.). In some embodiments, common reference documents (e.g., not specific to a target technology, a dictionary, a general list of frequently asked questions for a personal computer, or the like) may be ignored when generating an engagement metric data object, a sentiment metric data object, or the like.

The classification circuitry 214 may utilize or leverage one or more machine learning algorithms (e.g., classifiers, etc.) comprising one or more of a supervised and/or unsupervised artificial neural network (e.g., a feedforward artificial neural network, probabilistic artificial neural network, perceptron, multilayer perceptron, etc.), Naive Bayes classifier, decision tree, or other machine learning classifiers. For example, a machine learning classifier algorithm may include an artificial neural network which may comprise an input layer of one or more input nodes, a hidden layer of one or more hidden nodes, a plurality of other hidden layers, and/or an output layer of one or more output nodes. Any or all input metric data, in some embodiments, may be segmented (e.g., by segmentation circuitry 212) into individual code elements, tokenized text, and/or the like that can be entered into the input layer of the artificial neural network, processed through at least one hidden layer (e.g., applied with weighted values as described below), and a classification determination and/or metric data object (e.g., an engagement metric data object, etc.) may be provided by the output layer. In some embodiments, an unsupervised machine learning application or model may be trained to perform a particular clustering analysis (e.g., k-means clustering, or the like). In some embodiments, if the unsupervised machine learning model is trained to use a k-means clustering technique, the training for the unsupervised machine learning application or model may include utilizing a training technique (e.g., the elbow method, silhouette method, and/or the like) to determine the optimal k-value based on the input set of merchant data elements. In some embodiments, clustering analysis techniques may be utilized in conjunction with one or more statistical analysis techniques as described herein.

In some embodiments, the classification circuitry 214 may provide a classification analysis (e.g., sentiment analysis or the like) by comparing code elements, tokenized text, and/or other portions of metric data (e.g., segmented by the segmentation circuitry 212, parsed by a parsing algorithm, etc.) to a predefined list, table, and/or database of keywords, phrases, and/or the like associated with one or more metric classifications. The keywords may be associated with one or more metric classifications (e.g., an engagement metric classification, a sentiment metric classification, other user defined classifications, etc.) by a weighted value (e.g., a probability or likelihood of association). For example, the keyword "unhappy" may have a 50% likelihood of indicating that a string of text is representative of a user sentiment. Further analysis (e.g., sentiment analysis, etc.) of other keywords may be performed and may confirm that a sentiment metric classification (e.g., of an email, chat log, etc.) is, or is not, appropriate. For example, the keyword "unhappy" may be followed by other words "with the new software" and when analyzed as a span or string of text the phrase "unhappy with the new software" may have a 98% likelihood of indicating that a string of text is representative of a user sentiment. In some embodiments, a classification threshold may be used (e.g., for comparison) to determine if the metric classification will be applied to the metric data or a portion thereof. For example, a probability or likelihood of association equal to or greater than 65% may be required for the classification circuitry 214 to classify code elements, tokenized text, other portions of metric data, and/or the like into metric classifications. Still other classification threshold values (e.g., 50%, 85%, etc.) may be used. It should be appreciated that one advantage of using the classification circuitry 214 and/or the segmentation circuitry 212, as described herein, is that data (e.g., metric data, etc.) may be stored, processed, and/or transmitted in a more efficient manner and, thus, the computational resource burden placed on the computing infrastructure is reduced. For example, because larger data sets (e.g., raw/bulk metric data, or the like) may be transformed into smaller data objects (e.g., sentiment metric data object, or the like) that provide the necessary understanding (e.g., the user was unhappy with a training video, etc.) without the additional unnecessary data storage requirements (e.g., of entire emails or the like) the function of the computing infrastructure (e.g., local computers, servers, mobile devices, routers, modems, etc.) may be improved.

Although hardware components 202-214 are described in part using functional language, it will be understood that the particular implementations necessarily include the use of particular hardware. It should also be understood that certain of these hardware components 202-214 may include similar or common hardware. For example, the resource monitoring circuitry 208, technical engagement scoring circuitry 210, segmentation circuitry 212, and classification circuitry 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," "component," and/or "engine" with respect to elements of the apparatus 200 therefore shall be interpreted as necessarily including the particular hardware configured to perform the functions associated with the particular element being described. Of course, while the terms "circuitry," "component," and/or "engine" should be understood broadly to include hardware, in some embodiments, the terms "circuitry," "component," and/or "engine" may in addition refer to software instructions that configure the hardware components of the apparatus 200 to perform the various functions described herein.

Although the resource monitoring circuitry 208, technical engagement scoring circuitry 210, segmentation circuitry 212, and classification circuitry 214 may leverage the processor 202, memory 204, or communications hardware 206 as described above, it will be understood that any of resource monitoring circuitry 208, technical engagement scoring circuitry 210, segmentation circuitry 212, and classification circuitry 214 may include one or more dedicated processors, specially configured field programmable gate array (FPGA), or application specific interface circuit (ASIC) to perform its corresponding functions, and may accordingly leverage the processor 202 for executing software stored in a memory (e.g., memory 204, storage device 110, etc.), or communications hardware 206 for enabling any functions not performed by special-purpose hardware. In all embodiments, however, it will be understood that the resource monitoring circuitry 208, technical engagement scoring circuitry 210, segmentation circuitry 212, and classification circuitry 214, comprise particular machinery designed for performing the functions described herein in connection with such elements of apparatus 200.

Figure 3:
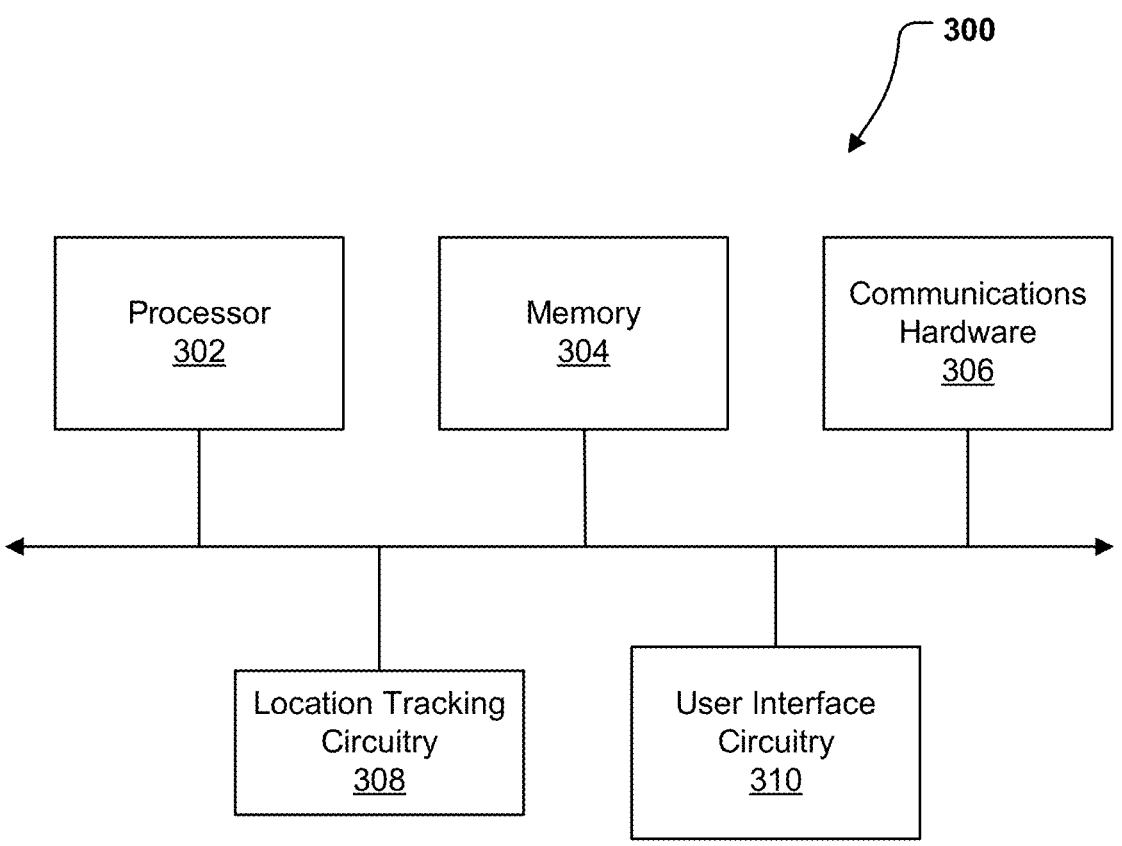
FIG. 3 illustrates a schematic block diagram of example circuitry embodying a user device and/or digital resource system that may perform various operations in accordance with some example embodiments described herein.

As illustrated in FIG. 3, an apparatus 300 is shown that represents an example user device (e.g., any of user devices 106A-106N) or an example rewards program system (e.g., any of digital resource systems 108A-108N). The apparatus 300 includes processor 302, memory 304, and communications hardware 306, each of which is configured to be similar to the similarly named components described above in connection with FIG. 2.

However, the apparatus 300 may also include location tracking circuitry 308, which includes hardware components designed for communicatively coupling with one or more of a satellite-based radio navigation system (e.g., global positioning system (GPS)), cellular network, radio-frequency identification (RFID) scanner, or local area network (LAN) (e.g., Wi-Fi, etc.) to determine the current location for the apparatus 300 (e.g., via GPS coordinates, radiolocation through triangulation between base stations, or the like). The location tracking circuitry 308 may utilize processor 302, memory 304, or any other hardware component included in the apparatus 300 to perform these operations, as described in connection with FIGS. 4 and 5A-5E below. The location tracking circuitry 308 may further utilize communications hardware 306 to communicate with navigation systems, cellular networks, LAN (e.g., Wi-Fi, etc.), and/or apparatus 200, or may otherwise utilize processor 302 and/or memory 304 to generate location data representative of the current location of the apparatus 300. In some embodiments, the location tracking circuitry 308 may identify the location of a user device (e.g., any of user devices 106A-106N) associated with a user account within a predefined proximity threshold of hardware associated with a particular digital resource system (e.g., any of digital resource systems 108A-108N). For example, during the rollout of new equipment in a factory metric data may be collected to identify any user accounts associated with user devices (e.g., apparatus 300) that come within a predefined proximity threshold (e.g., one meter, etc.) of the equipment operator seat.

In some embodiments, the location based metric data may be used to determine a length of time that any user accounts associated with user devices operated the equipment (e.g., a metal press, waterjet, packaging machine, etc.). In some embodiments, location data may be leveraged by apparatus 200 and/or apparatus 300 along with other metric data to determine engagement metrics more accurately. For example, location data may be cross-checked against software application log data to determine if a user that was logged into a software for one-hour was actually located at their computer for that full hour. In such examples, if the user device is determined to have moved away from the computer accessing the software at some time during that one-hour period then the engagement metric data object generated from that metric data may indicate a reduced length of time that the user account engaged with the software application (e.g., total time logged in minus the time away from the computer).

In addition, the apparatus 300 may also include user interface circuitry 310, which includes hardware components designed for receiving user inputs and/or rendering virtual graphical outputs. The user interface circuitry 310 may utilize processor 302, memory 304, or any other hardware component included in the apparatus 300 to perform these operations, as described in connection with FIGS. 4 and 5A-5E below. The user interface circuitry 310 may further utilize communications hardware 306 to transmit data representative of a user input and/or receive data to render as a virtual graphical output, or may otherwise utilize processor 302 and/or memory 304 to generate data representative of a user input and/or generate virtual graphical output, e.g., from based on received data. The user interface circuitry 310 may comprise one or more of a keyboard, pointing device, touchscreen, microphone with speech recognition interface, camera with gesture-based interface, or other input device capable of receiving various different user inputs. In addition, the user interface circuitry 310 may comprise a display device including one or more of a screen with graphical user interface (GUI), speaker, light emitting diode (LED), haptic technology device (e.g., vibration motor, etc.), or other output device capable of rendering computer interpretable information into human interpretable information.

In some embodiments, various components of the apparatus 200 and/or apparatus 300 may be hosted remotely (e.g., by one or more cloud servers) and thus need not physically reside on the corresponding apparatus (e.g., apparatus 200 and/or apparatus 300). For instance, some components of the apparatus 200 may not be physically proximate to the other components of apparatus 200. Similarly, some or all of the functionality described herein may be provided by third-party circuitry (e.g., web services, etc.). For example, a given apparatus 200 may access one or more third-party circuitries in place of local circuitries for performing certain functions.

As will be appreciated based on this disclosure, example embodiments contemplated herein may be implemented by one or more of an apparatus 200 and/or apparatus 300. Furthermore, some example embodiments may take the form of a computer program product comprising software instructions stored on at least one non-transitory computer-readable storage medium (e.g., memory 204, etc.). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses (e.g., apparatus 200 and apparatus 300), example embodiments are described below in connection with a series of graphical user interfaces and flowcharts.

Example Operations

Turning to FIGS. 4 and 5A-5E, example flowcharts are illustrated that contain example operations implemented by example embodiments described herein. The operations illustrated in FIGS. 4 and 5A-5E may, for example, be performed by a system device (e.g., server, personal computer, etc.) of the technical engagement monitoring system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, resource monitoring circuitry 208, technical engagement scoring circuitry 210, segmentation circuitry 212, classification circuitry 214, and/or any combination thereof. It will be understood that user interaction with the technical engagement monitoring system 102 may occur directly via communications hardware 206, or may instead be facilitated by a separate user device (e.g., any of user devices 106A-106N shown in FIG. 1, which may in turn be embodied by apparatus 300, which is shown and described in connection with FIG. 3), and which may have similar or equivalent physical componentry facilitating such user interaction.

Meanwhile, in some embodiments, the technical engagement monitoring system 102 (e.g., embodied as apparatus 200) may leverage other computing resources (e.g., via the communications network 104, such as, any of user devices 106A-106N and/or digital resource systems 108A-108N shown in FIG. 1), which may in turn be embodied by an apparatus 300 which is shown and described in connection with FIG. 3. In some embodiments, to perform the operations described below, the apparatus 300 may utilize one or more of processor 302, memory 304, communications hardware 306, location tracking circuitry 308, user interface circuitry 310, and/or any combination thereof.

Turning first to FIG. 4, example operations are shown for monitoring and/or tracking technical engagement of digital resources.

As shown by operation 402, the apparatus 200 may include means, such as resource monitoring circuitry 208 or the like, for deploying a machine learning monitoring application to a computing environment comprising one or more of a computing device or a network channel. In some embodiments, the network channel may comprise one or more of a wired network communication channel (e.g., Ethernet, fiber-optic, universal serial bus (USB), and/or other wired communication cable connections as described herein) or a wireless network communication channel (e.g., Wi-Fi, Bluetooth, and/or other long, medium, or short-range wireless communication protocols as described herein). In some embodiments, operation 402 may include causing transmission of an installation data object (e.g., executable file, batch file, software installation instructions, etc.) from a first computing device (e.g., a server of the technical engagement monitoring system 102, user devices 106A-106N, etc.) to one or more second computing devices (e.g., any of user devices 106A-106N, digital resource systems 108A-108N, servers, routers, modems, particular hardware, or the like as described herein). The installation data object may include installation instructions or the like for installing one or more machine learning monitoring applications (e.g., neural networks, chat bots, monitoring bots, or the like as described herein) configured for monitoring and/or tracking technical engagement between digital resources. In some embodiments, a first installation data object may include installation instructions or the like for installing a primary machine learning monitoring application (e.g., on a server of the technical engagement monitoring system 102) configured for monitoring and/or tracking technical engagement between digital resources by receiving data from localized machine learning monitoring applications (e.g., monitoring bots, etc.).

Further, one or more second installation data objects may include installation instructions or the like for installing the localized machine learning monitoring applications (e.g., on any of user devices 106A-106N, digital resource systems 108A-108N, etc.) configured for collecting metric data from a host computing device. For example, at least a monitoring bot may be installed on one or more personal computers (e.g., any of user devices 106A-106N, etc.) to monitor and collect metric data (e.g., emails, communications network traffic, digital training documents accessed, or the like as described herein) from one or more user accounts logged into the one or more personal computers. Further, the monitoring bot may leverage the segmentation circuitry 212 and/or classification circuitry 214 to identify (e.g., based on keywords or the like as described above) metric data associated with the target technology. Furthermore, the monitoring bot may leverage hardware from its host computing device (e.g., embodied as apparatus 300), such as, memory 304 to at least temporarily record the metric data (e.g., a copy thereof) and/or communications hardware 306 to cause transmission of the metric data to the technical engagement monitoring system 102 (e.g., a remote server, storage device 110, or the like). In some embodiments, the metric data may be further utilized by the technical engagement monitoring system 102 as described herein in connection with apparatus 200 and/or the operations of FIGS. 4 and 5A-5E. In some embodiments, a monitoring bot may leverage the location tracking circuitry 308 of a host computing device (e.g., a mobile device, etc.) to determine and/or track location data associated with a user account as described above in connection with FIG. 3. In some embodiments, a monitoring bot may leverage the user interface circuitry 310 of a host computing device (e.g., a user device, etc.) to determine and/or track data representative of a user input associated with a user account as described above in connection with FIG. 3.

Furthermore, in some embodiments, the apparatus 200 may include means, such as resource monitoring circuitry 208 or the like for receiving user inputs to define one or more lists, tables, and/or databases of keywords, phrases, code elements, code tags, and/or the like to identify and/or detect metric data associated with a target technology. For example, after installation of one or more machine learning monitoring applications an administrator user associated with an administrator account may define monitoring parameters (e.g., keywords in emails, firewall ports, FTP network locations, user accounts, and/or the like as described here) for identifying metric data associated with the target technology. The monitoring parameters may further include (e.g., keywords in emails, firewall ports, FTP network locations, user accounts, and/or the like as described here) to be ignored to limit the collection of non-pertinent metric data associated with other non-target technologies (e.g., older software, older versions, general reference documents, and/or the like) of an entity's computing infrastructure. Moreover, operation 402 may leverage and/or include any of the functionality described above in connection with FIG. 2 for the resource monitoring circuitry 208 or the like.

As shown by operation 404, the apparatus 200 may include means, such as resource monitoring circuitry 208 or the like, for detecting an engagement metric associated with a target technology of the computing environment and a user account of the computing environment. In some embodiments, operation 404 may include detecting an engagement metric data object, as described below. In some embodiments, one or more the machine learning monitoring applications may be leveraged (as described above) for detecting metric data (e.g., engagement metrics, sentiment metrics, etc.). In some embodiments, an engagement metric may be associated with interactions between a target technology and an existing technology of the computing environment. For example, a machine learning monitoring application may monitor and/or track when a target technology (e.g., newly installed software, etc.) is allowed and/or blocked by existing security software (e.g., firewalls, anti-virus software, etc.) and a log of these interactions (e.g., including firewall ports accessed, software instructions block, timestamps of the interaction, or the like) may be recorded. The log (e.g., data object, etc.) may be transmitted to an administrator user to facilitate configuration of the existing security software parameters (e.g., to ensure the target technology can access required computing infrastructure functionalities, such as, accessing web services or the like). Moreover, operation 404 may leverage and/or include any of the functionality described above in connection with FIG. 2 for the resource monitoring circuitry 208 or the like. Further, example embodiments of the underlying mechanism for implementing operation 404 will be described in greater detail below in connection with FIG. 5A.

As shown by operation 406, the apparatus 200 may include means, such as resource monitoring circuitry 208 or the like, for generating name-value pair data representative of the engagement metric, the user account, and a timestamp token. In some embodiments, name-value pair data may be generated based, at least in part, on metric data (e.g., engagement metrics, sentiment metrics, or the like). In some embodiments, operation 406 may include recording the name-value pair data (e.g., to storage device 110, etc.) in one or more standardized formats (e.g., name-value pair data, arrays, or other data objects or data structures with a particular format) predefined, or dynamically defined, by the technical engagement monitoring system 102 or a component thereof (e.g., a neural network, other machine learning application or algorithm, database, or the like). In some embodiments, the name-value pair data may comprise a plurality of name-value pairs, data objects, data structures, and/or the like as described herein. In some embodiments, operation 406 may include encrypting the name-value pair data before transmitting and/or recording the name-value pair data. In some embodiments, the name-value pair data may, at least in part, be encrypted (e.g., using symmetric-key algorithms, public key algorithms, and/or any other encryption techniques) to block unauthorized access to any sensitive information comprised in the name-value pair data. Moreover, operation 406 may leverage and/or include any of the functionality described above in connection with FIG. 2 for the resource monitoring circuitry 208 or the like.

As shown by operation 408, the apparatus 200 may include means, such as technical engagement scoring circuitry 210, or the like, for generating a technical engagement score representative of a probability of a successful utilization of the target technology by the user account. In some embodiments, the technical engagement score may be generated based, at least in part, on name-value pair data. In some embodiments, operation 408 may include assigning the technical engagement score to a user account, e.g., in a database associated with the technical engagement monitoring system 102. In some embodiments, operation 408 may include recording the technical engagement score and associated a user account data, e.g., in a database associated with the technical engagement monitoring system 102, and make the technical engagement score and associated user account data accessible to be updated based on additional metric data as described herein. Moreover, operation 408 may leverage and/or include any of the functionality described above in connection with FIG. 2 for the technical engagement scoring circuitry 210 or the like. Further, example embodiments of the underlying mechanism for implementing operation 408 will be described in greater detail below in connection with FIGS. 5B-5C.

Finally, as shown by operation 410, the apparatus 200 may include means, such as processor 202, memory 204, communications hardware 206, resource monitoring circuitry 208, technical engagement scoring circuitry 210, segmentation circuitry 212, classification circuitry 214, or the like, for initializing, based on the technical engagement score, an actionable instruction set. In some embodiments, operation 410 may include executing an actionable instruction set. For example, operation 410 may include executing software instructions to cause transmission of a text message (e.g., Short Messaging Service (SMS) text, Multimedia Messaging Service (MMS) text, email, etc.) comprising an alert notification to, e.g., a user device associated with an administrator user account. Moreover, operation 410 may leverage and/or include any of the functionality described above in connection with FIG. 2 for the technical engagement scoring circuitry 210 or the like. Further, example embodiments of the underlying mechanism for implementing operation 410 will be described in greater detail below in connection with FIGS. 5D-5E.

In some embodiments, operation 404 may be performed in accordance with the operations described by FIG. 5A. Turning now to FIG. 5A, example operations are shown for classifying metric data.

As shown by operation 502, the apparatus 200 may include means, such as resource monitoring circuitry 208 or the like, for detecting metric data associated with the target technology within a database of the computing device or within a transmission entering or exiting the network channel. In some embodiments, operation 502 may include dynamically and/or automatically scanning network traffic entering or exiting the network channel and/or periodically scanning databases, files, data objects, or the like stored on a user device or other computing device described in connection with FIG. 1 above. For example, the resource monitoring circuitry 208 may utilize a machine learning monitoring application (as described above) in conjunction with a predefined list, table, and/or database of keywords, phrases, code elements, code tags, and/or the like to scan communications network traffic (e.g., via network channels of communications network 104, through a port of a firewall, etc.) to detect metric data associated with the target technology. Further, the machine learning monitoring application may leverage the predefined list, table, and/or database of keywords, phrases, code elements, code tags, and/or the like to scan databases, files, or the like (e.g., stored on user devices 106A-106N, digital resource systems 108A-108N, or the like) to detect metric data associated with the target technology. In some embodiments, operation 502 may include retrieving a predefined data set from a database. Further, the predefined data set may comprise one or more of a code element, tokenized text, or other portions of metric data. Furthermore, any code elements, tokenized text, or other portions of metric data may be representative of a target technology.

As shown by operation 504, the apparatus 200 may include means, such as resource monitoring circuitry 208 or the like, for recording the metric data to a remotely accessible database. In some embodiments, operation 504 may include recording a copy of the metric data to a remotely accessible database and/or a locally accessible database. In some embodiments, the recorded metric data, or copy thereof, may be updated to include additional data (e.g., a timestamp token representative of a detection time, recording time, or the like). The recorded metric data, or copy thereof, may be stored on storage device 110, memory 204, memory 304, and/or any other non-transitory computer-readable storage medium as described above. In some embodiments, operation 504 may include leveraging the communication hardware 206 to cause transmission of the metric data, or copy thereof, to one or more databased stored on one or more non-transitory computer-readable storage media.

As shown by operation 506, the apparatus 200 may include means, such as communications hardware 206, segmentation circuitry 212, classification circuitry 214, or the like, for segmenting the metric data into code elements or tokenized text. In some embodiments, operation 506 may include segmenting a copy of the metric data into code elements or tokenized text. In some embodiments, operation 506 may include receiving or retrieving metric data, or a copy thereof, from a remotely accessible database, a locally accessible database, and/or non-transitory computer-readable storage medium. For example, the metric data, or a copy thereof, recorded at operation 504 as described above may be retrieved from memory 204, or the like, by the segmentation circuitry 212 (e.g., leveraging the communications hardware 206, etc.) to initiate the segmentation operations described herein. In some embodiments, operation 506 may include segmenting metric data, or a copy thereof, into code elements, tokenized text, other portions of the metric data, and/or the like. In some embodiments, operation 506 may include segmenting a predefined data set (e.g., a training data set, historical data set from a previous rollout, etc.) into a plurality of training data sets (e.g., for training an artificial neural network). Further, the plurality of training data sets may comprise an equal number of code elements, tokenized text, and/or the like. In some embodiments, the plurality of training data sets may comprise an unequal number of code elements, tokenized text, and/or the like.

In some embodiments, operation 506 may include segmenting metric data utilizing a machine learning application (as described above) comprising one or more of a supervised and/or unsupervised artificial neural network (e.g., a feedforward artificial neural network, probabilistic artificial neural network, perceptron, multilayer perceptron, etc.), Naive Bayes classifier, decision tree, executable neural semantic parser, or other algorithms (e.g., parsers, tokenizers, etc.). For example, operation 506 may utilize tokenizers and/or other NLP techniques as described above for segmenting larger data structures (e.g., text, audio, etc.) comprising human language (e.g., English, Italian, Japanese, etc.) into smaller portions (e.g., tokenized text including phrases, words, letters, numbers, symbols, etc.). Moreover, in some embodiments, operation 506 may include segmenting metric data utilizing one or more NLP pipelines configured for receiving data (e.g., emails, forum ports, text, audio, etc.) and segmenting smaller portions. Further, at least one NLP pipeline may be configured for segmenting engagement metric data objects (e.g., based on engagement keywords, such as, login, task type, or the like as described herein) and at least another NLP pipeline may be configured for segmenting sentiment metric data objects (e.g., based on sentiment keywords, such as, happy, unhappy, or the like as described herein).

As shown by operation 508, the apparatus 200 may include means, such as classification circuitry 214 or the like, for classifying at least a portion of the metric data into one or more of an engagement metric classification or a sentiment metric classification. In some embodiments, operation 508 may include classifying at least a portion of a copy of the metric data into one or more of an engagement metric classification or a sentiment metric classification. In some embodiments, operation 508 may include identifying portions of metric data, a copy thereof, or the like with one or more metric classifications including an engagement metric classification, a sentiment metric classification, and/or a custom metric classification. A custom metric classification may be defined by a user input and may be specific to a target technology. For example, in an instance in which the target technology is manufacturing equipment a custom metric classification may comprise a production number classification (e.g., representative of a number of usable parts produced) and/or a scrap number classification (e.g., representative of a number of unusable parts produced that will be discarded or "scrapped"). In some embodiments, operation 508 may include mapping keywords, or the like, (e.g., segmented at operation 506) by comparing code elements, tokenized text, and/or other portions of metric data to a predefined list, table, and/or database of keywords, phrases, and/or the like associated with one or more metric classifications. In some embodiments, operation 508 may include classifying keywords, or the like, (e.g., segmented at operation 506) based on one or more machine learning algorithms (e.g., classifiers, etc.) comprising one or more of a supervised and/or unsupervised artificial neural network (e.g., a feedforward artificial neural network, probabilistic artificial neural network, perceptron, multilayer perceptron, etc.), Naive Bayes classifier, decision tree, or other machine learning classifiers.

In some embodiments, operation 508 may include comparing keywords, or the like, to a database of keywords, or the like, associated with one or more classification metrics. A probability, or likelihood, of association between the keywords, or the like, for one or more classification metrics may be determined. The determined probability, or likelihood, of association may be compared to a classification threshold. In an instance in which the determined probability, or likelihood, of association (e.g., for one or more classification metrics) is equal to or greater than the classification threshold, operation 508 may include classifying the keywords, or the like, with the one or more classification metrics. In an instance in which the determined probability, or likelihood, of association (e.g., for one or more classification metrics) is less than the classification threshold, operation 508 may include blocking classification of the keywords, or the like, with the one or more classification metrics. For example, if a keyword, or other portion of metric data, has a probability, or likelihood, of association equal to or greater than 70% then the keyword, or other portion of metric data, may be classified with the one or more classification metrics (e.g., engagement metric classification, etc.). Still other classification threshold values (e.g., 40%, 75%, etc.) may be used.

In some embodiments, in an instance in which the determined probability, or likelihood, of association (e.g., for one or more classification metrics) is less than the classification threshold, operation 508 may include generating a blocked list of words (e.g., for the one or more classification metrics) that includes the keywords, or the like. It should be appreciated that the blocked list may be updated with additional keywords, or the like, during additional iterations of operation 508. Operation 508 may further include comparing additional keywords, or the like, to the blocked list to reduce the burden placed on computational resources by ignoring keywords, or the like, that have already been added to the blocked list; thus, in some embodiments, the same or substantially similar keywords (e.g., unhappy, annoyed, sad, and/or other words indicating the same sentiment) do not need to be reanalyzed each time they appear in metric data. In some embodiments, a machine learning application (e.g., NLP pipeline or the like as described above) may utilize a dictionary and/or thesaurus to populate a blocked list with the same or similar keywords, phrases, or the like and, thus, further reducing the burden on computational resources by simplifying population of the blocked list. In some embodiments, in an instance in which the determined probability, or likelihood, of association (e.g., for one or more classification metrics) is equal to or greater than the classification threshold, operation 508 may include generating an allowed list of words (e.g., for the one or more classification metrics) that includes the keywords, or the like. It should be understood that the allowed list may provide similar advantages, as described above for the blocked list, for reducing the burden on computational resources.

As shown by operation 510, the apparatus 200 may include means, such as segmentation circuitry 212, classification circuitry 214, or the like, for generating the engagement metric in an instance the metric data is classified, at least in part, into the engagement metric classification. In some embodiments, operation 510 may include generating the engagement metric in an instance the copy of the metric data is classified, at least in part, into the engagement metric classification. In some embodiments, generating the engagement metric may include generating an engagement metric data object that includes a portion of the metric data classified with the engagement metric classification. For example, the metric data may be an email from a user account (e.g., to a helpdesk user account, etc.) with additional unclassified data (e.g., salutations, signature block, metadata, etc.) and in the email a single sentence may note that the user account was unhappy with using to particular software (e.g., a target technology) because they were unable to login to the particular software that morning. Thus, an engagement metric data object may be generated (as described above in connection with segmentation circuitry 212 and/or classification circuitry 214 of FIG. 2) including only the pertinent engagement metric data. For example, an example engagement metric data object may include: ['engagement metric classification.', 'new software.', 'failed.', 'login.', 'Jane.Doe@email.com.'].

In some embodiments, the engagement metric data object may further include a timestamp token, e.g., representative of time and date of the email or a time and date referenced in the email. In some embodiments, the engagement metric data object may comprise one or more of a number of times or a time period the user account utilized the target technology, a number of incident tickets generated for the user account with a helpdesk application for the target technology, a number of times or a time period the user account accessed a training document or a training video for the target technology, a portion thereof, or other engagement metrics as described herein. Still other formats (e.g., data structures, etc.) and data (e.g., tokenized text, code elements, etc.) may be utilized to generate engagement metric data objects. In some embodiments, the metric data, or a copy thereof, (e.g., used to generate the engagement metric data object) may define a non-standardized format and the engagement metric data object may define a standardized format (e.g., predefined by a machine learning monitoring application, or the like as described above, that generated the engagement metric data object). In some embodiments, operation 510 may include generating a custom metric data object comprising a custom metric classification based, at least in part, on user inputs defining the format and data to be included in the custom metric data object.

Finally, as shown by operation 512, the apparatus 200 may include means, such as segmentation circuitry 212, classification circuitry 214, or the like, for generating a sentiment metric in an instance the metric data is classified, at least in part, into the sentiment metric classification. In some embodiments, operation 510 may include generating a sentiment metric in an instance the copy of the metric data is classified, at least in part, into the sentiment metric classification. In some embodiments, generating the sentiment metric may include generating a sentiment metric data object that includes a portion of the metric data classified with the sentiment metric classification. For example, the metric data may be an email from a user account (e.g., to a helpdesk user account, etc.) with additional unclassified data (e.g., salutations, signature block, metadata, etc.) and in the email a single sentence may note that the user account was unhappy with using to particular software (e.g., a target technology) because they were unable to login to the particular software that morning. Thus, a sentiment metric data object may be generated (as described above in connection with segmentation circuitry 212 and/or classification circuitry 214 of FIG. 2) including only the pertinent sentiment metric data. For example, an example sentiment metric data object may include: ['sentiment metric classification.', 'new software.', 'unhappy.', 'Jane.Doe@email.com.'].

In some embodiments, the sentiment metric data object may further include a timestamp token, e.g., representative of time and date of the email or a time and date referenced in the email. In some embodiments, the sentiment metric data object may comprise one or more of a feedback survey, an email, a chat, helpdesk application data associated with the user account, a representation of a user satisfaction level associated with utilizing the target technology, a training document for the target technology, a training video for the target technology, a portion thereof, or other sentiment metrics as described herein. Still other formats (e.g., data structures, etc.) and data (e.g., tokenized text, code elements, etc.) may be utilized to generate sentiment metric data objects. In some embodiments, the metric data, or a copy thereof, (e.g., used to generate the sentiment metric data object) may define a non-standardized format and the sentiment metric data object may define a standardized format (e.g., predefined by a machine learning monitoring application, or the like as described above, that generated the sentiment metric data object). In some embodiments, operation 512 may include generating a custom metric data object comprising a custom metric classification based, at least in part, on user inputs defining the format and data to be included in the custom metric data object.

Figure 5B:
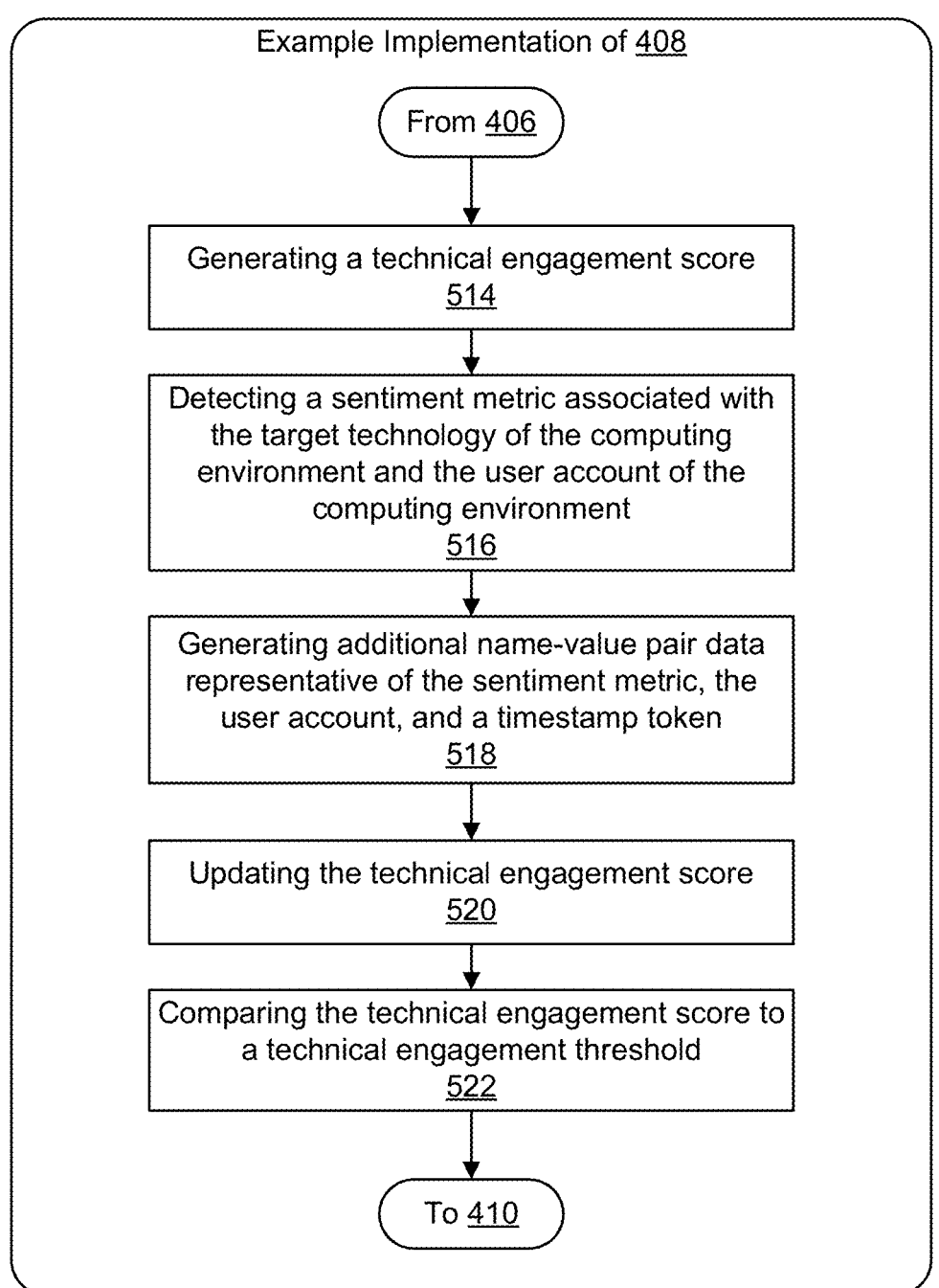
FIG. 5B illustrates an example flowchart for generating and/or updating a technical engagement score based on a sentiment metric, in accordance with some example embodiments described herein.

In some embodiments, operation 408 may be performed in accordance with the operations described by FIG. 5B. Turning now to FIG. 5B, example operations are shown for generating and/or updating a technical engagement score based on a sentiment metric.

As shown by operation 514, the apparatus 200 may include means, such as technical engagement scoring circuitry 210 or the like, for generating a technical engagement score. In some embodiments, operation 514 may include generating an initial, or base, technical engagement score. In some embodiments, the initial, or base, technical engagement score may be based on first name-value pair data. In some embodiments, the initial, or base, technical engagement score may be based on a default initial score predefined by a user input or a default software parameter, for example, a base technical engagement score may be generated that defaults to 0.00 or 0%. In such embodiments, the initial, or base, technical engagement score may be generated before analyzing any name-value pair data.

As shown by operation 516, the apparatus 200 may include means, such as communications hardware 206, resource monitoring circuitry 208, segmentation circuitry 212, classification circuitry 214, or the like, for detecting a sentiment metric associated with the target technology of the computing environment and the user account of the computing environment. In some embodiments, operation 516 may include detecting a sentiment metric data object, as described above. For example, one or more NLP pipelines may be utilized to scan stored and/or transmitted data (e.g., emails, forum ports, text files, audio files, etc.) for keywords, phrases, and/or the like representative of sentiments, emotions, and/or the like associated with a user of a user account in relation to a target technology. Still other machine learning applications, as described above, may be leveraged for detecting one or more sentiment metrics (e.g., sentiment metric data objects).

As shown by operation 518, the apparatus 200 may include means, such as resource monitoring circuitry 208 or the like, for generating additional name-value pair data. In some embodiments, the additional name-value pair data may be representative of an engagement metric, a sentiment metric, a user account, and a timestamp token and generated based, at least in part, on a sentiment metric (e.g., sentiment metric data object), an engagement metric (e.g., engagement metric data object), or the like as described above. In some embodiments, name-value pair data (and/or additional name-value pair data) may be generated in a format the same as, or substantially similar to, the example engagement metric data objects and the example sentiment metric data objects described above (e.g., in connection with operation 510, operation 512, and/or FIG. 2). Still other formats, as described above, may be utilized for formatting name-value pair data (and/or additional name-value pair data). In some embodiments, operation 518 may further include some or all of operation 406 as described above in connection with FIG. 4. In some embodiments, operation 518 may leverage and/or include any of the functionality described above in connection with FIG. 2 for the resource monitoring circuitry 208 or the like.

As shown by operation 520, the apparatus 200 may include means, such as technical engagement scoring circuitry 210 or the like, for updating the technical engagement score. In some embodiments, operation 520 may include updating a technical engagement score (e.g., an initial, or base, technical engagement score, a technical engagement score retrieved from historical data, etc.) for a user account based, at least in part, on the additional name-value pair data. In some embodiments, operation 520 may include generating an updated technical engagement score (e.g., different from an initial, or base, technical engagement score) based, at least in part, on the additional name-value pair data. For example, an initial technical engagement score may be generated at operation 514 (as described above) based, at least in part, on a sentiment metric data object or the like and an updated technical engagement score may be generated based, at least in part, on the initial technical engagement score and an engagement metric data object or the like.

In this manner, it should be appreciated that the technical engagement score associated with a user account may be a real-time, or near-real-time, representation of a user's successful utilization of a target technology that may be rendered to one or more users via one or more graphical user interfaces. Further, it should be appreciated that the technical engagement score associated with a user account may be a real-time, or near-real-time, representation of a severity of technical problems associated with the user account (e.g., insufficient computing resources of the user device). For example, the user account may be associated with an older user device that does not meet the minimum system requirements of a target technology (e.g., insufficient memory, insufficient processing power, a lack of compatible ports for new hardware, etc.). In some embodiments, operation 520 may include updating a technical engagement score to further include a technical engagement score explanation comprising a text explanation for a technical engagement score being below a technical engagement threshold (as described below). In some embodiments, a technical engagement score explanation may be dynamically and/or automatically applied to user account (and/or a technical engagement score thereof) in an instance in which insufficient minimum system requirements are detected for a user device based on the minimum system requirements of a target technology.

Finally, as shown by operation 522, the apparatus 200 may include means, such as technical engagement scoring circuitry 210 or the like, for comparing the technical engagement score to a technical engagement threshold. In some embodiments, a technical engagement score may be a range of values between 0% and 100% or the like (e.g., 0.00 and 1.00, etc.). For example, a technical engagement score of 0% may be representative of a user account never engaging, or at least never successfully engaging (e.g., complete a task in a software, etc.), with a target technology. Further, a technical engagement score of 100% may be representative of a user account successfully engaging with a target technology across all monitored and/or tracked engagement metrics (e.g., successful completion a task in a software during every recorded attempt by a user account, successful completion of all required training requirements assigned to a user account, a combination thereof, and/or the like as described herein). It should be understood that technical engagement scores greater than 0% and less than 100% may be representative of a user account successfully engaging with a target technology proportional to the technical engagement score between the two extremes described above. In some embodiments, a technical engagement threshold may be a minimum score required to pass training and/or activate security credentials of a user account (e.g., password, login, etc.) to utilize the target technology (e.g., outside of training, without supervision, with additional features activated, etc.). In some embodiments, a technical engagement threshold may be a predefined value between 0% and 100%, predefined by a user input (e.g., of an administrator user, etc.).

In some embodiments, a technical engagement threshold may be dynamically, and/or automatically, updated based on the historical data of a user account. For example, technical engagement threshold may be defaulted (e.g., or be predefined) at 70% successful completion of assigned training requirements (e.g., watching one or more videos and completing one or more questions, quizzes, tests, or the like associated with each of the one or more videos). In an instance in which the user account fails multiple attempts (e.g., 3 in a row or the like) to reach the technical engagement threshold of 70%, the technical engagement threshold may be dynamically, and/or automatically, updated to increase or decrease the technical engagement threshold (e.g., to 75%, 65%, or the like). In some embodiments, the technical engagement threshold may be increased to incentivize a user of a user account to practice more before making further attempts which may further increase the technical engagement threshold if they fail. In some embodiments, the technical engagement threshold may be decreased to account for a user technical literacy, a lack of proper digital training resources (e.g., a required video has not been uploaded, etc.), or a lack of minimum system requirements to fully utilize the target technology. In some embodiments, the technical engagement threshold may be decreased in an instance in which a user account fails to reach the increased technical engagement threshold (e.g., of 75% or the like) but has reach the original technical engagement threshold (e.g., of 70% or the like). In some embodiments, comparing the technical engagement score to a technical engagement threshold may further cause initializing an actionable instruction set as described below in connection with FIGS. 5D-5E.

Figure 5C:
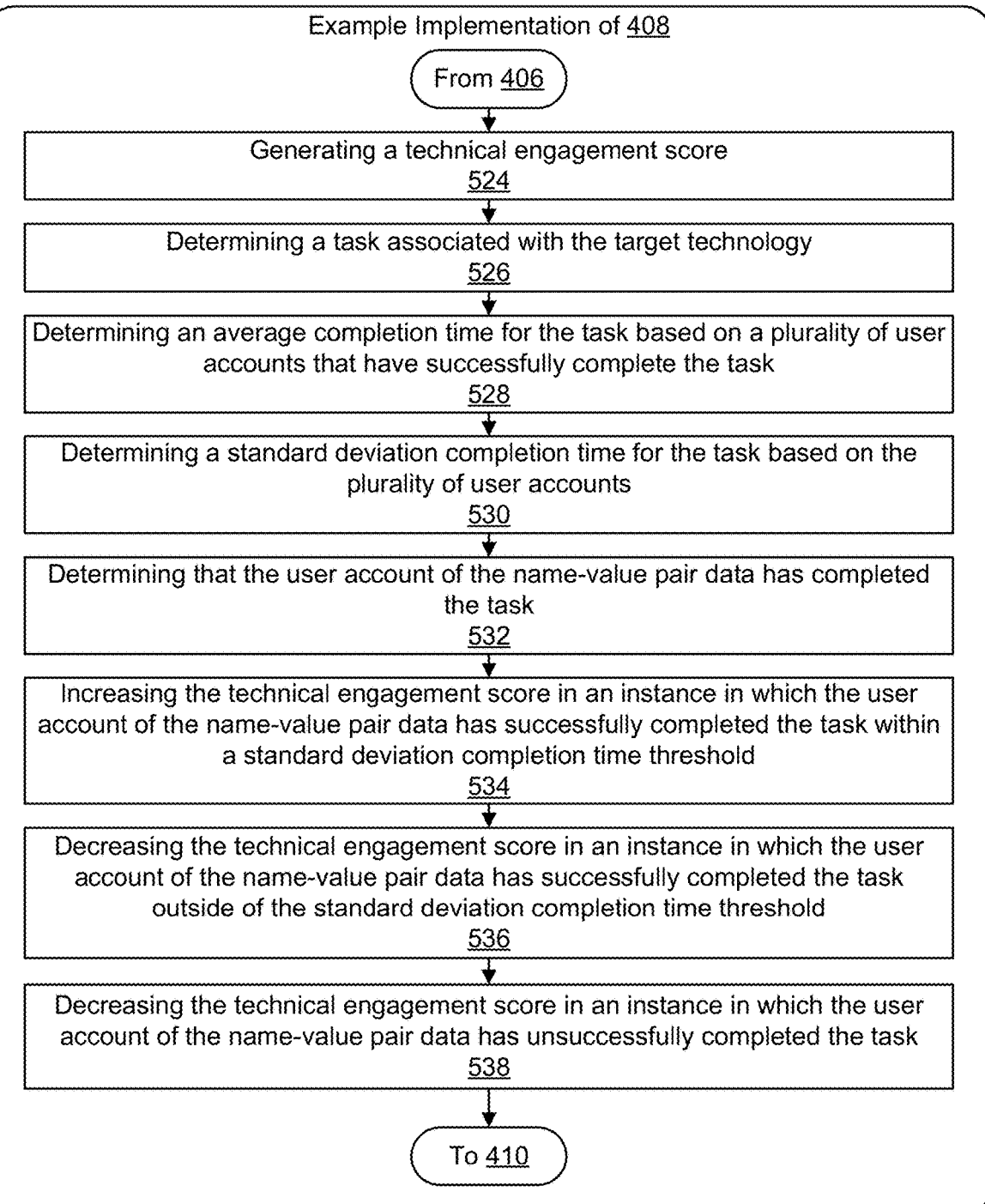
FIG. 5C illustrates an example flowchart for generating and/or updating a technical engagement score based on a statistical analysis, in accordance with some example embodiments described herein.

In some embodiments, operation 408 may be performed in accordance with the operations described by FIG. 5C. Turning now to FIG. 5C, example operations are shown for generating and/or updating a technical engagement score based on a statistical analysis.

As shown by operation 524, the apparatus 200 may include means, such as technical engagement scoring circuitry 210 or the like, for generating a technical engagement score. In some embodiments, operation 524 may further include some or all of operation 514 as described above in connection with FIG. 5B.

As shown by operation 526, the apparatus 200 may include means, such as resource monitoring circuitry 208 or the like, for determining a task associated with the target technology. In some embodiments, operation 526 may include determining that a particular task has, at least in part, been performed in association with a user account and a target technology. In some embodiments, operation 526 may include identifying a task associated with the target technology based on one or more of an execution of software instructions, generation of a data object (e.g., output file from targeted software), location data indicating a user device is proximate an operator's position for hardware (as described above in connection with the location tracking circuitry 308), or through the detection of metric data or the like as described herein. In some embodiments, operation 526 may include receiving, or retrieving, a data set comprising the plurality of user accounts that have successfully completed the task, e.g., from storage device 110 or the like described herein.

As shown by operation 528, the apparatus 200 may include means, such as resource monitoring circuitry 208 or the like, for determining an average completion time for the task based on a plurality of user accounts that have successfully completed the task. In some embodiments, operation 528 may include determining an average completion time for a task based, at least in part, on a statistical analysis (e.g., mean, average, moving average, etc.) of a plurality of user accounts that have successfully completed the task. In some embodiments, operation 528 may include dynamically, and/or automatically, determining a moving average completion time for a task based, at least in part, on a moving average calculation of a plurality of user accounts that periodically (e.g., regularly, semi-regularly, etc.) complete the task (e.g., daily, weekly, bi-weekly, monthly, etc.). In some embodiments, operation 528 may include determining an average completion time for a task based, at least in part, on an average completion time defined by a user input (e.g., 5 minutes, 1 hour, etc.) received via a graphical user interface. In some embodiments, operation 528 may include leveraging a machine learning application (as described above) to identify any variables (e.g., a plurality of completion times, a total number of user accounts, or the like), and/or mathematical properties (e.g., equations, constants, mathematical operations, etc.), required to calculate an average completion time from a data set comprising the plurality of user accounts that have successfully completed the task.

As shown by operation 530, the apparatus 200 may include means, such as resource monitoring circuitry 208 or the like, for determining a standard deviation completion time for the task based on the plurality of user accounts. In some embodiments, operation 530 may include determining a standard deviation completion time based on the average completion time based, at least in part, on a plurality of user accounts that have successfully completed the task. In some embodiments, operation 530 may include determining a standard deviation completion time based, at least in part, on a standard deviation completion time defined by a user input (e.g., 1 minute, 15 minutes, etc.) received via a graphical user interface. In some embodiments, operation 530 may include calculating a standard deviation completion time using an uncorrected sample standard deviation, corrected sample standard deviation, unbiased sample standard deviation, and/or other standard deviation equations. In some embodiments, operation 530 may include calculating a confidence interval of a standard deviation completion time. In some embodiments, operation 530 may include leveraging a machine learning application (as described above) to identify any variables (e.g., variance, covariance, mean, mean expected value, or the like), and/or mathematical properties (e.g., equations, constants, mathematical operations, etc.), required to calculate a standard deviation completion time from a data set comprising the plurality of user accounts that have successfully completed the task.

As shown by operation 532, the apparatus 200 may include means, such as resource monitoring circuitry 208 or the like, for determining that the user account of the name-value pair data has completed the task. In some embodiments, operation 532 may include determining that a particular user account has completed a task based on name-value pair data (e.g., generated at operation 406 described above in connection with FIG. 4). In some embodiments, operation 532 may include determining that the particular user account is, or is not, included in the data set comprising the plurality of user accounts that have successfully completed the task. In an instance in which the particular user account is determined not to be included in the data set, operation 532 may include adding the particular user account to the data set, e.g., after calculation of a standard deviation completion time and/or an average completion time as described above.

As shown by operation 534, the apparatus 200 may include means, such as technical engagement scoring circuitry 210 or the like, for increasing the technical engagement score in an instance in which the user account of the name-value pair data has successfully completed the task within a standard deviation completion time threshold. In some embodiments, operation 534 may include increasing a technical engagement score in an instance in which the user account of the name-value pair data has successfully completed the task within a standard deviation completion time threshold. The standard deviation completion time threshold may be equal to one or more standard deviation completion times (e.g., 1, 2, 3 standard deviations or the like). In some embodiments, operation 534 may include determining a standard deviation completion time threshold based, at least in part, on a user input (e.g., 1, 2, 3, or the like) received via a graphical user interface.

As shown by operation 536, the apparatus 200 may include means, such as technical engagement scoring circuitry 210 or the like, for decreasing the technical engagement score in an instance in which the user account of the name-value pair data has successfully completed the task outside of the standard deviation completion time threshold and below the average completion time for the task. In some embodiments, operation 536 may include increasing a technical engagement score in an instance in which the user account of the name-value pair data has successfully completed the task outside of the standard deviation completion time threshold and above the average completion time for the task.

Finally, as shown by operation 538, the apparatus 200 may include means, such as technical engagement scoring circuitry 210 or the like, for decreasing the technical engagement score in an instance in which the user account of the name-value pair data has unsuccessfully completed the task. In some embodiments, operation 538 may include receiving a user input representative of an administrator user's review of the completed task (e.g., work product, resultant data object, etc.) and indicating that the task was unsuccessfully completed (e.g., not completed within a required time, not properly completed, produced a flawed work product, etc.). For example, an administrator user may be notified (e.g., by an alert notification, etc.) that a user account has completed a task (e.g., entered data in a fillable form, generated a data object, produced a work product, etc.) with a target technology (e.g., new software, manufacturing equipment, etc.). Further, the administrator user may review the completed task and determine that one or more flaws exist (e.g., incorrect data in specific fields of a fillable form, an out-of-specification product was produced, etc.). Furthermore, the administrator user may provide a user input (e.g., via a graphical user input, etc.) indicating that the user account indicated by the name-value pair data has unsuccessfully completed the task. In some embodiments, the administrator user's review may be performed, at least in part, by a machine learning application (e.g., neural network and/or the like as described herein) that has been trained on historical data. The historical data may comprise previous user input data from one or more administrator users' reviews of similar completed task that have been completed successfully and/or unsuccessfully. In some embodiments, the historical data may be used to initially train and/or re-train (e.g., supervise) the machine learning application (e.g., neural network, classifier, etc.) as described above.

In some embodiments, operation 410 may be performed in accordance with the operations described by FIG. 5D. Turning now to FIG. 5D, example operations are shown for initializing an actionable instruction set based on a technical engagement score.

As shown by operation 540, the apparatus 200 may include means, such as communications hardware 206 or the like, for causing transmission of an actionable notification indicating that the user account has been assigned digital training resources (e.g., a training document, a training video, etc.) for the target technology in an instance in which the technical engagement score is less than the technical engagement threshold. The actionable notification may be, at least in part, an email, text message (e.g., SMS, MMS, or the like), progressive user interface (e.g., a set of real-time, or near-real-time, instant messages between a chat bot and a user account), a link to a digital training document, and/or the like for providing instructions to a user account to perform a task (e.g., action, etc.). In some embodiments, operation 540 may further include initializing an actionable instruction set that initiates a credential expiration timer (e.g., countdown timer for 24 hours, 1 week, etc.) that will deactivate one or more credentials associated a user account. For example, the user account may receive an email indicating that they have unsuccessfully completed a training quiz for a new software and, thus, must follow a link to complete another equivalent training quiz. Further, the email may indicate that if the training quiz is not completed successfully within 5 business days the user account's login for the new software will be deactivated.

As shown by operation 542, the apparatus 200 may include means, such as communications hardware 206 or the like, for causing transmission of an actionable notification indicating that the user account has successfully completed training procedures for the target technology in an instance in which the technical engagement score is equal to or greater than the technical engagement threshold. The actionable notification may be, at least in part, an email, text message (e.g., SMS, MMS, or the like), progressive user interface (e.g., a set of real-time, or near-real-time, instant messages between a chat bot and a user account), a link to create a login for new software, and/or the like for providing instructions to a user account to perform a task (e.g., action, etc.). In some embodiments, operation 540 may further include initializing an actionable instruction set that generates a custom link for the user account to activate one or more credentials associated with a target technology. For example, the user account may receive an email indicating that they have successfully completed all training requirements to utilize new hardware and, thus, must follow a link to create a login, password or pin, and upload an employee photo of themselves (e.g., via a webcam, scanner, etc.) to generate a user badge for unlocking the new hardware. The user badge may include an RFID token that can be transmitted to, and/or downloaded on, a user device (e.g., mobile device, etc.). The RFID token may be utilized to unlock use of new hardware (e.g., a forklift, a printer, etc.) when the RFID token is provided to an RFID scanner (e.g., the user device touches or is brought near an RFID scanner) of the new hardware. In some embodiments, a user badge may include one or more of an RFID token, a barcode, a matrix code, biometrics, and/or other digital resources that can be transmitted to, and/or downloaded on, a user device to interface with a target technology (e.g., via an RFID scanner, optical scanner, biometric scanner, etc.). Further, a user badge may include one or more of a physical token (e.g., key, card, label, fob, etc.), a fingerprint, and/or other form factors that can interface with a target technology (e.g., via an RFID scanner, optical scanner, biometric scanner, lock, etc.). In some embodiments, location data (as described above in connection with FIG. 3) associated with a user account may be used in conjunction with a user badge to access a target technology (e.g., software, hardware, etc.).

Finally, as shown by operation 544, the apparatus 200 may include means, such as communications hardware 206 or the like, for causing transmission of an actionable notification indicating that the user account has been identified as a key contributor for the target technology in an instance in which the technical engagement score is equal to or greater than a second technical engagement threshold. The second technical engagement threshold may be greater than a first technical engagement threshold. In some embodiments, a key contributor may be a user account that has completed training procedures and/or requirements for a target technology with an above average technical engagement score (e.g., one or more standard deviations above the average technical engagement score). Further, a key contributor may be a user account that has provided answers to questions associated with target technology via one or more of a group chat, email, or other group communications. Furthermore, a key contributor may be a user account that has generated one or more digital training resources by reviewing a digital training resource for deficiencies or errors, recording a training video, writing a training document, or contributing to digital training resources in other forms. In an instance in which a user account has been identified as a key contributor for a target technology, the operation 544 may further include causing transmission of an actionable notification representative of a request for one or more user inputs to supervise one or more aspects of the technical engagement monitoring system 102 (e.g., review of digital training resources, supervising a machine learning application, becoming an administrator user, etc.). For example, a user account that has been identified as a key contributor may provide user inputs in response to one or more outputs of a neural network, classifier, or other machine learning application. Further, the user inputs may be used as training data to train a neural network (as described above in connection with FIG. 2). In an instance in which a user account has been identified as a key contributor for a target technology, the operation 544 may further include updating one or more credentials associated a user account to an administrator user account for a target technology.

Figure 5E:
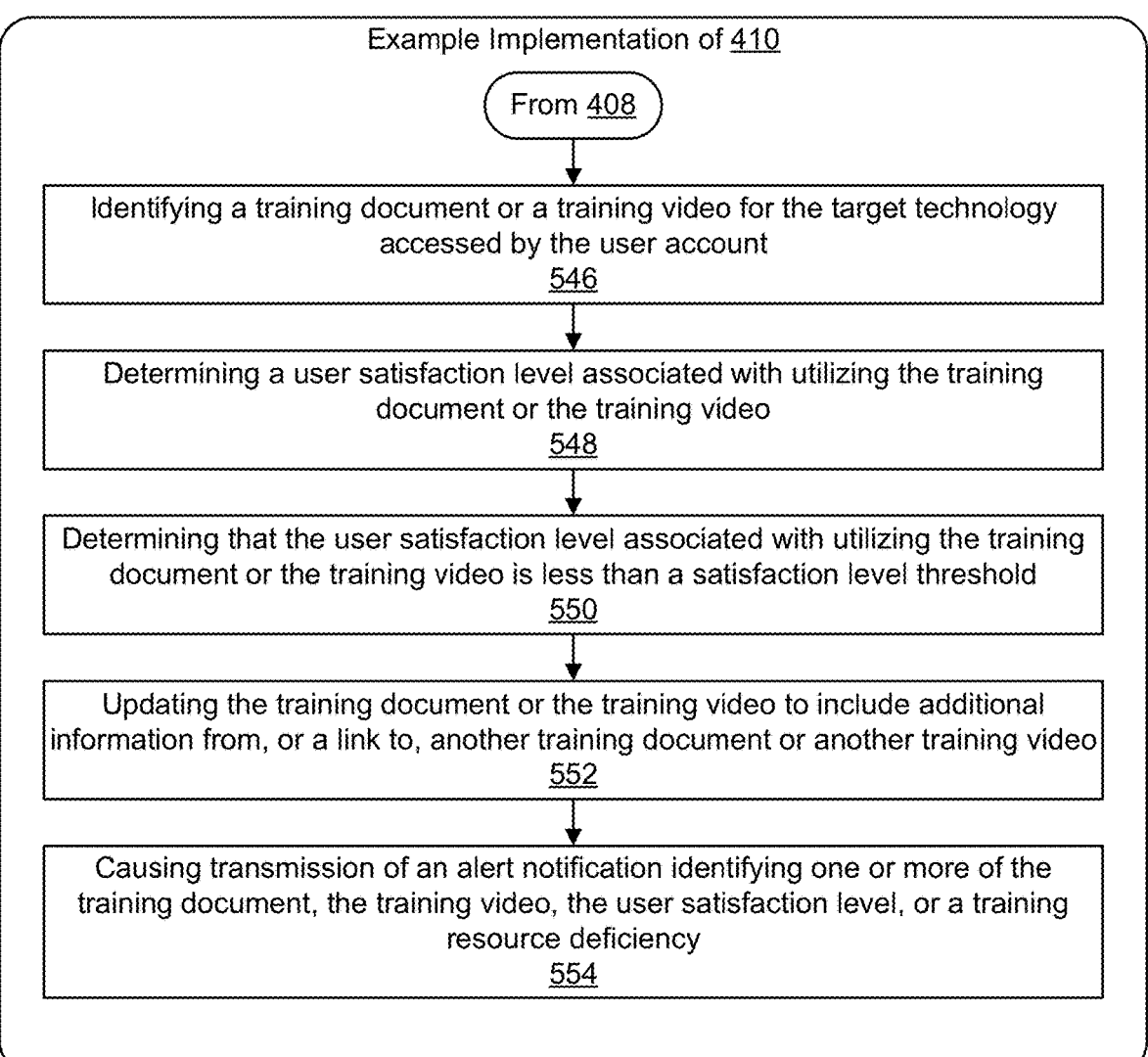
FIG. 5E illustrates an example flowchart for detecting and/or remedying a deficiency, or error, of a digital training resource, in accordance with some example embodiments described herein.

In some embodiments, operation 410 may be performed in accordance with the operations described by FIG. 5E. Turning now to FIG. 5E, example operations are shown for detecting and/or remedying a deficiency of a digital training resource.

As shown by operation 546, the apparatus 200 may include means, such as resource monitoring circuitry 208 or the like, for identifying a training document or a training video for the target technology accessed by the user account. In some embodiments, operation 546 may include identifying one or more digital training resources as described herein. In some embodiments, operation 546 may include retrieving, or receiving, a log of digital training resources accessed by a user account (e.g., from storage device 110, a remote server hosting digital training resources, any of digital resource systems 108A-108N, etc.). In some embodiments, operation 546 may include determining that a user account accessed a digital training resource by scanning data stored on a user device (e.g., any of user devices 106A-106N or the like) and, in response, detecting a copy of the digital training resource on the user device. In some embodiments, operation 546 may include determining that a user account accessed a digital training resource by scanning network traffic entering or exiting a network channel and, in response, detecting that a digital training resource is being provided (e.g., streamed to, copied to, or accessed by) the user device via one or more network channels. In some embodiments, operation 546 may include determining that a user account accessed a digital training resource based, at least in part, on name-value pair data representative of a sentiment metric, engagement metric, user account, time-stamp token, or the like. Still other techniques may be utilized for identifying one or more digital training resources accessed by a user account (e.g., based, at least in part, on emails, texts, chat logs, helpdesk incident tickets etc.).

As shown by operation 548, the apparatus 200 may include means, such as resource monitoring circuitry 208 or the like, for determining a user satisfaction level associated with utilizing the training document or the training video. In some embodiments, operation 548 may include determining a user satisfaction level associated with utilizing one or more digital training resources as described herein. The user satisfaction level may be determined based, at least in part, on a sentiment metric data object, survey, rating, review, or the like associated with a user account. In some embodiments, a user satisfaction level may be a value between 0% and 100%. For example, a user satisfaction level of 0% being representative of very unhappy or dissatisfied and a user satisfaction level of 100% being representative of very happy or satisfied (e.g., with a digital training resource, target technology, etc.). It should be understood that user satisfaction levels greater than 0% and less than 100% may be representative of a user's satisfaction with a digital training resource and/or target technology proportional to the user satisfaction level between the two extremes described above. For example, a user satisfaction level of 50% being equally greater than 0% and less than 100% may be representative of a neutral emotion (e.g., neither happy nor unhappy) toward the digital training resource and/or target technology. Further, user satisfaction levels greater than 50% may be more happy than unhappy while user satisfaction levels less than 50% may be more unhappy than happy. In some embodiments, a user account may provide one or more user inputs defining a user satisfaction level. For example, a user account may complete a survey indicating a user satisfaction level of 70% or another value.

As shown by operation 550, the apparatus 200 may include means, such as resource monitoring circuitry 208 or the like, for determining that the user satisfaction level associated with utilizing the training document or the training video is less than a satisfaction level threshold. In some embodiments, operation 550 may include comparing the user satisfaction level to the satisfaction level threshold. In some embodiments, operation 550 may include determining (e.g., based, at least in part, on the comparison) that the user satisfaction level associated with utilizing the digital training resource is less than, equal to, or greater than a satisfaction level threshold. The satisfaction level threshold may be one or more values, or ranges of values, defined by a user input (e.g., from an administrator user account). For example, an administrator user may define a scale for rating user satisfaction from 0% to 100% comprising a first range from 0% to 65% as unhappy, a second range from 65% to 89% as satisfactory, and a third range from 90% to 100% as happy (e.g., with the target technology and/or a particular experience with the target technology).

In some embodiments, operation 550 may include identifying a deficiency or error in a digital training resource based, at least in part, on data associated with user satisfaction levels less than a satisfaction level threshold. For example, a neural network (or other machine learning application) may receive, at least in part, sentiment metric data objects or other data (e.g., emails, chat logs, etc.) as inputs fed into an input layer of the neural network. Further, the neural network may determine (e.g., based at least in part on keywords or phrases, such as "couldn't find," "missing details," "incorrect," "wrong," and/or the like) that pertinent information is absent from, or incorrect in, a digital training resource. Further, the neural network may leverage statistical analysis and/or clustering analysis as described above for identifying a deficiency or error.

As shown by operation 552, the apparatus 200 may include means, such as resource monitoring circuitry 208 or the like, for updating the training document or the training video to include additional information from, or a link to, another training document or another training video. In some embodiments, operation 552 may include initializing one or more actionable instruction sets (as described herein) to perform one or more of the operations described below in connection with operation 552. In some embodiments, operation 552 may be performed in response to determining that the user satisfaction level is less than the satisfaction level threshold. In some embodiments, operation 552 may include updating the digital training resource to include additional information from, or a link to, another digital training resource and/or to include additional information provided by a user input (e.g., from a key contributor). In some embodiments, operation 552 may include updating the digital training resource to delete incorrect information from a digital training resource and/or add correct information from another digital training resource or other data source as described herein (e.g., a user input, etc.). For example, a machine learning application (e.g., neural network, generative pre-trained transformer, large language model, a combination thereof, or the like as described herein) may identify the deficiency (e.g., missing information), or error (e.g., incorrect information), and may further generate one or more updates for a digital training resource (or generate a new digital training resource) to remedy the deficiency or error. In some embodiments, the another digital training resource (e.g., containing the missing information or correct information) may be identified based, at least in part, from a user input (e.g., a user account may note in an email where the missing information was found, a key contributor, etc.).

In some embodiments, the another digital training resource (e.g., containing the missing information or correct information) may be identified based, at least in part, from network traffic. For example, a machine learning application may determine that at least some user accounts used to identify the deficiency, or error, accessed another digital training resource (e.g., related to the deficient or erroneous digital training resource via metadata or tags). In addition, the machine learning application may determine that at least some of these user accounts were associated with an increased technical engagement score after accessing the another digital training resource. Further, the machine learning application may determine that the increased technical engagement score is, at least in part, associated with accessing the another digital training resource because those user accounts successfully completed a task (e.g., related to the deficient or erroneous digital training resource and the another digital training resource). In some embodiments, the successfully completed task, the deficient or erroneous digital training resource and the another digital training resource may all be related based, at least in part, on equivalent metadata or tags (e.g., keywords, phrases, classifications, etc.). Still other operations and/or actionable instruction sets (as described herein) may be performed at operation 552, e.g., in response to identifying a deficiency or error in a digital training resource at operation 550.

Finally, as shown by operation 554, the apparatus 200 may include means, such as communications hardware 206 or the like, for causing transmission of an alert notification identifying one or more of the training document, the training video, the user satisfaction level, or a training resource deficiency. In some embodiments, operation 554 may be performed in response to determining that the user satisfaction level is less than the satisfaction level threshold. In some embodiments, operation 554 may include causing transmission of an alert notification identifying one or more digital training resources, user satisfaction levels, deficiencies or errors in digital training resources, user accounts, links, and/or other data utilized at operations 546-554. In some embodiments, operation 554 may further include initializing one or more actionable instruction sets (as described herein). Still other operations may be performed and/or other actionable instruction sets may be initialized (as described herein) at operation 554 to provide alert notifications.

FIGS. 4 and 5A-5E illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved monitoring and tracking of technical engagement between digital resources for the rollout of new technologies. Example embodiments thus provide tools that overcome the problems faced by conventional implementation system technologies and/or document management and storage technologies. By leveraging machine learning applications (e.g., artificial neural networks, classifiers, tokenizers, chat bots, etc.), example embodiments as described herein avoid the need to rely upon manual and subjective human evaluation of digital training resources and trainee performance, example embodiments thus save time and computing resources, while also eliminating the possibility of human error that has been unavoidable in the past with conventional systems. Moreover, embodiments described herein avoid excess memory and bandwidth burdens associated with excessively large digital training resources because machine learning applications may objectively identify the most pertinent information to incorporate into digital training resources and, further, may be configured to conform to specific computational limits (e.g., predefined file sizes for digital training resources).

In addition, by tracking aggregate engagement metric and/or sentiment metric data example embodiments can generate and update digital training resources to meet specific user and/or departmental requirements, example embodiments thus can objectively target individual (e.g., needing more or less detailed information) and/or departmental requirements (e.g., for specific tasks, particular computing functionality, etc.) which has not previously been possible. Finally, by automating (e.g., via machine learning, neural network, chat bots, etc.) functionality that has historically required subjective human analysis, the speed and consistency of the user account evaluations and/or digital training document evaluations performed by example embodiments unlocks many potential new functions that conventional systems have historically not been able to provide (e.g., due to human subjectivity, a lack of monitoring and tracking systems as described herein, security requirements, etc.), such as the ability to objectively identify in real-time, or near-real-time, deficiencies in digital training resources and/or the ability to securely monitor departments that handle sensitive information without the need for costly additional vetting (e.g., governmental background checks, etc.) of human employees with specialized rollout training (e.g., specialized training skills for a new software, hardware, etc.) and/or without the risk of additional communications network openings (e.g., additional open firewall ports and/or user accounts and passwords, etc.) that can be targeted by cyber-attacks (e.g., malware, hackers, viruses, unpatched vulnerabilities, DDoS attacks, and/or the like).

As these examples all illustrate, example embodiments contemplated herein provide technical solutions that solve real-world problems faced during the rollout of new and/or additional digital resources on, across, or in conjunction with, a computing infrastructure comprising one or more of a server, personal computer, router, modem, databases, and/or the like as described herein. And while the rollout of new, and/or additional, digital resources has been an issue for decades, the recently exploding amount of data and computing functionality made available by recently emerging technologies today has made this problem significantly more acute, as the demand and expectation for implementing the newest technology to utilize the latest computing functionality has grown significantly even while the conventional systems and methods for implementing these new technologies has itself failed to keep up with these expectations. At the same time, the recently arising ubiquity of machine learning (e.g., chat bots, artificial neural networks, etc.) and user device location tracking (e.g., more accurate GPS, greater precision of triangulation with 5G mobile networks, etc.) has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for tracking technical engagement of digital resources, the method comprising:

deploying, by resource monitoring circuitry, a machine learning monitoring application to a computing environment comprising a computing device and a network channel, wherein the network channel comprises one or more of a wired network communication channel or a wireless network communication channel;

from network traffic of the network channel, detecting, by the resource monitoring circuitry and using the machine learning monitoring application, an engagement metric associated with an interaction between a target technology of the computing environment and a user account of the computing environment;

identifying, by the resource monitoring circuitry and based on the engagement metric, a first digital training resource utilized by the user account for the target technology;

generating, by the resource monitoring circuitry and based on the engagement metric, name-value pair data representative of the engagement metric, the user account, and a timestamp token;

generating, by technical engagement scoring circuitry and based on the name-value pair data, a technical engagement score for the user account, the technical engagement score comprising a probability of a successful utilization of the target technology by the user account;

comparing, by the technical engagement scoring circuitry, the technical engagement score to a technical engagement threshold;

determining, by the technical engagement scoring circuitry and based on the comparison, that the technical engagement score does not satisfy the technical engagement threshold; and executing, by the technical engagement scoring circuitry and based on the technical engagement score, actions comprising:

from network traffic of the network channel, determining, by the resource monitoring circuitry and using the machine learning monitoring application, a second digital training resource accessed by a second user account of the computing environment;

determining, by the resource monitoring circuitry and using the machine learning monitoring application, an increase in a second technical engagement score associated with the second user account occurring after the second user account accessed the second digital training resource; and causing transmission, by communications hardware and to the user account, of an actionable notification indicating that the user account has been assigned additional training for the target technology, the additional training comprising the second digital training resource.

2. The method of claim 1, further comprising:

detecting, by the resource monitoring circuitry, metric data associated with the target technology within a database of the computing device or within a transmission entering or exiting the network channel;

recording, by the resource monitoring circuitry, a copy of the metric data to a remotely accessible database;

segmenting, by segmentation circuitry, the copy of the metric data into code elements or tokenized text;

classifying, by classification circuitry and based on the code elements or the tokenized text, at least a portion of the copy of the metric data into one or more of an engagement metric classification or a sentiment metric classification;

generating, by the classification circuitry, the engagement metric in an instance in which the copy of the metric data is classified, at least in part, into the engagement metric classification; and generating, by the classification circuitry, a sentiment metric in an instance in which the copy of the metric data is classified, at least in part, into the sentiment metric classification, wherein the metric data defines a non-standardized format and the engagement metric and the sentiment metric each define a standardized format defined by the machine learning monitoring application.

3. The method of claim 1, wherein the engagement metric comprises one or more of a number of times or a time period the user account utilized the target technology, a number of incident tickets generated for the user account with a helpdesk application for the target technology, or a number of times or a time period the user account accessed a training document or a training video for the target technology.

4. The method of claim 1, further comprising:
detecting, by the resource monitoring circuitry and using the machine learning monitoring application, a sentiment metric associated with the target technology of the computing environment and the user account of the computing environment;
generating, by the resource monitoring circuitry and based on the sentiment metric, additional name-value pair data representative of the sentiment metric, the user account, and a timestamp token;
updating, by the technical engagement scoring circuitry and based on the additional name-value pair data, the technical engagement score;
comparing, by the technical engagement scoring circuitry, the technical engagement score to the technical engagement threshold; and
causing transmission, by communications hardware to the user account, of an actionable notification indicating that the user account has been assigned a training document or a training video for the target technology in an instance in which the technical engagement score does not satisfy the technical engagement threshold;
causing transmission, by the communications hardware to the user account, of an actionable notification indicating that the user account has successfully completed training procedures for the target technology in an instance in which the technical engagement score is satisfies the technical engagement threshold; and
causing transmission, by the communications hardware to the user account, of an actionable notification indicating that the user account has been identified as a key contributor for the target technology in an instance in which the technical engagement score satisfies a second technical engagement threshold, wherein the second technical engagement threshold is different than the technical engagement threshold.

5. The method of claim 4, wherein the sentiment metric comprises one or more of a feedback survey, an email, a chat, or helpdesk application data associated with the user account, and wherein the sentiment metric is representative of a user satisfaction level associated with utilizing the target technology, a training document for the target technology, or a training video for the target technology.

6. The method of claim 1, wherein the target technology comprises one or more of a software application, a software update or a specific software application version, a firmware update or a specific firmware version, or a hardware component.

7. The method of claim 1, wherein the machine learning monitoring application comprises a neural network, and wherein the method further comprises training the neural network of the machine learning monitoring application by:
retrieving, by the resource monitoring circuitry, a predefined data set from a database, wherein the predefined data set comprises one or more of code elements or tokenized text, wherein the code elements or the tokenized text are representative of the target technology;
segmenting, by segmentation circuitry, the predefined data set into a plurality of training data sets, wherein each of the plurality of training data sets comprises an equal number of the one or more of code elements or tokenized text;
propagating, by the resource monitoring circuitry, a first training data set of the plurality of training data sets forward through a neural network of the machine learning monitoring application to generate a first output representative of a detection of metric data associated with the target technology and the user account of the computing environment;
determining, by the resource monitoring circuitry, a first error between the first output of the neural network and the predefined data set;
propagating, by the resource monitoring circuitry, the first output back through the neural network in reverse to adjust for the first error;
propagating, by the resource monitoring circuitry, a second training data set of the plurality of training data sets forward through the neural network of the machine learning monitoring application to generate a second output representative of another detection of the metric data; and
determining, by the resource monitoring circuitry, a second error between the second output of the neural network and the predefined data set, wherein the second error is less than the first error.

8. The method of claim 1, further comprising:
determining, by the resource monitoring circuitry, a task associated with the target technology;
determining, by the resource monitoring circuitry, an average completion time for the task based on a plurality of user accounts that have successfully completed the task;
determining, by the resource monitoring circuitry, a standard deviation completion time for the task based on the plurality of user accounts;
determining, by the resource monitoring circuitry, that the user account of the name-value pair data has completed the task;
increasing, by the technical engagement scoring circuitry, the technical engagement score in an instance in which the user account of the name-value pair data has successfully completed the task within a standard deviation completion time threshold;
decreasing, by the technical engagement scoring circuitry, the technical engagement score in an instance in which the user account of the name-value pair data has successfully completed the task outside of the standard deviation completion time threshold; and
decreasing, by the technical engagement scoring circuitry, the technical engagement score in an instance in which the user account of the name-value pair data has unsuccessfully completed the task.

9. The method of claim 1, further comprising:
identifying, by the resource monitoring circuitry and based on the engagement metric, a training document or a training video for the target technology accessed by the user account;
determining, by the resource monitoring circuitry and based on a sentiment metric, a user satisfaction level associated with utilizing the training document or the training video;

determining, by the resource monitoring circuitry, that the user satisfaction level associated with utilizing the training document or the training video is less than a satisfaction level threshold; and in response to determining that the user satisfaction level is less than the satisfaction level threshold:

updating, by the resource monitoring circuitry using the machine learning monitoring application, the training document or the training video to include additional information from, or a link to, another training document or another training video, and causing transmission, by communications hardware, of an alert notification identifying one or more of the training document, the training video, the user satisfaction level, or a training resource deficiency.

10. An apparatus for tracking technical engagement of digital resources, the apparatus comprising:

resource monitoring circuitry configured to:

deploy a machine learning monitoring application to a computing environment comprising a computing device and a network channel, wherein the network channel comprises one or more of a wired network communication channel or a wireless network communication channel, detect, from network traffic of the network channel and using the machine learning monitoring application, an engagement metric associated with an interaction between a target technology of the computing environment and a user account of the computing environment, identify, based on the engagement metric, a first digital training resource utilized by the user account for the target technology; and generate, based on the engagement metric, name-value pair data representative of the engagement metric, the user account, and a timestamp token; and technical engagement scoring circuitry configured to:

generate, based on the name-value pair data, a technical engagement score for the user account, the technical engagement score comprising a probability of a successful utilization of the target technology by the user account, compare the technical engagement score to a technical engagement threshold;

determine, based on the comparison, that the technical engagement score does not satisfy the technical engagement threshold; and execute, based on the technical engagement score, actions comprising:

from network traffic of the network channel, determining, using the machine learning monitoring application, a second digital training resource accessed by a second user account of the computing environment;

determining, using the machine learning monitoring application, an increase in a second technical engagement score associated with the second user account occurring after the second user account accessed the second digital training resource; and causing transmission, to the user account, of an actionable notification indicating that the user account has been assigned additional training for the target technology, the additional training comprising the second digital training resource.

11. The apparatus of claim 10, wherein the resource monitoring circuitry is further configured to:

detect metric data associated with the target technology within a database of the computing device or within a transmission entering or exiting the network channel, and record a copy of the metric data to a remotely accessible database; and wherein the apparatus further comprises:

segmentation circuitry configured to segment the copy of the metric data into code elements or tokenized text; and classification circuitry configured to:

classify, based on the code elements or the tokenized text, at least a portion of the copy of the metric data into one or more of an engagement metric classification or a sentiment metric classification, generate the engagement metric in an instance in which the copy of the metric data is classified, at least in part, into the engagement metric classification, and generate a sentiment metric in an instance in which the copy of the metric data is classified, at least in part, into the sentiment metric classification, wherein the metric data defines a non-standardized format and the engagement metric and the sentiment metric each define a standardized format defined by the machine learning monitoring application.

12. The apparatus of claim 10, wherein the engagement metric comprises one or more of a number of times or a time period the user account utilized the target technology, a number of incident tickets generated for the user account with a helpdesk application for the target technology, or a number of times or a time period the user account accessed a training document or a training video for the target technology.

13. The apparatus of claim 10, wherein the resource monitoring circuitry is further configured to:

detect, using the machine learning monitoring application, a sentiment metric associated with the target technology of the computing environment and the user account of the computing environment, and generate, based on the sentiment metric, additional name-value pair data representative of the sentiment metric, the user account, and a timestamp token; and wherein the technical engagement scoring circuitry is further configured to:

update, based on the additional name-value pair data, the technical engagement score, and compare the technical engagement score to a technical engagement threshold; and wherein the apparatus further comprises communications hardware configured to:

cause transmission, to the user account, of an actionable notification indicating that the user account has been assigned a training document or a training video for the target technology in an instance in which the technical engagement score does not satisfy the technical engagement threshold, cause transmission, to the user account, of an actionable notification indicating that the user account has successfully completed training procedures for the target technology in an instance in which the technical engagement score satisfies the technical engagement threshold, and cause transmission, to the user account, of an actionable notification indicating that the user account has been identified as a key contributor for the target technology in an instance in which the technical engagement score satisfies a second technical engagement threshold, wherein the second technical engagement threshold is different than the technical engagement threshold.

14. The apparatus of claim 13, wherein the sentiment metric comprises one or more of a feedback survey, an email, a chat, or helpdesk application data associated with the user account, and wherein the sentiment metric is representative of a user satisfaction level associated with utilizing the target technology, a training document for the target technology, or a training video for the target technology.

15. The apparatus of claim 10, wherein the target technology comprises one or more of a software application, a software update or a specific software application version, a firmware update or a specific firmware version, or a hardware component.

16. The apparatus of claim 10, wherein the machine learning monitoring application comprises a neural network;

wherein the resource monitoring circuitry is further configured to:

retrieve a predefined data set from a database, wherein the predefined data set comprises one or more of code elements or tokenized text, wherein the code elements or the tokenized text are representative of the target technology; and wherein the apparatus further comprises segmentation circuitry configured to segment the predefined data set into a plurality of training data sets, wherein each of the plurality of training data sets comprises an equal number of the one or more of code elements or tokenized text; and wherein the resource monitoring circuitry is further configured to:

propagate a first training data set of the plurality of training data sets forward through a neural network of the machine learning monitoring application to generate a first output representative of a detection of metric data associated with the target technology and the user account of the computing environment, determine a first error between the first output of the neural network and the predefined data set, propagate the first output back through the neural network in reverse to adjust for the first error, propagate a second training data set of the plurality of training data sets forward through the neural network of the machine learning monitoring application to generate a second output representative of another detection of the metric data, and determine a second error between the second output of the neural network and the predefined data set, wherein the second error is less than the first error.

17. The apparatus of claim 10, wherein the resource monitoring circuitry is further configured to:

determine a task associated with the target technology, determine an average completion time for the task based on a plurality of user accounts that have successfully completed the task, determine a standard deviation completion time for the task based on the plurality of user accounts, and determine that the user account of the name-value pair data has completed the task; and wherein the technical engagement scoring circuitry is further configured to:

increase the technical engagement score in an instance in which the user account of the name-value pair data has successfully completed the task within a standard deviation completion time threshold, decrease the technical engagement score in an instance in which the user account of the name-value pair data has successfully completed the task outside of the standard deviation completion time threshold, and decrease the technical engagement score in an instance in which the user account of the name-value pair data has unsuccessfully completed the task.

18. The apparatus of claim 10, wherein the resource monitoring circuitry is further configured to:

identify, based on the engagement metric, a training document or a training video for the target technology accessed by the user account, determine, based on a sentiment metric, a user satisfaction level associated with utilizing the training document or the training video, determine that the user satisfaction level associated with utilizing the training document or the training video is less than a satisfaction level threshold, and in response to determining that the user satisfaction level is less than the satisfaction level threshold, update, using the machine learning monitoring application, the training document or the training video to include additional information from, or a link to, another training document or another training video; and wherein the apparatus further comprises communications hardware configured, in response to determining that the user satisfaction level is less than the satisfaction level threshold, to cause transmission of an alert notification identifying one or more of the training document, the training video, the user satisfaction level, or a training resource deficiency.

19. A computer program product for tracking technical engagement of digital resources, the computer program product comprising at least one non-transitory computer-readable storage medium storing software instructions that, when executed, cause an apparatus to:

deploy a machine learning monitoring application to a computing environment comprising a computing device and a network channel, wherein the network channel comprises a wired network communication channel or a wireless network communication channel;

detect, from network traffic of the network channel and using the machine learning monitoring application, an engagement metric associated with an interaction between a target technology of the computing environment and a user account of the computing environment;

generate, based on the engagement metric, name-value pair data representative of the engagement metric, the user account, and a timestamp token;

identify, based on the engagement metric, a first digital training resource utilized by the user account for the target technology;

generate, based on the name-value pair data, a technical engagement score for the user account, the technical engagement score comprising a probability of a successful utilization of the target technology by the user account;

compare the technical engagement score to a technical engagement threshold;

determine, based on the comparison, that the technical engagement score does not satisfy the technical engagement threshold; and execute, based on the technical engagement score, actions comprising:

from network traffic of the network channel, determining, using the machine learning monitoring application, a second digital training resource accessed by a second user account of the computing environment;

determining, using the machine learning monitoring application, an increase in a second technical engagement score associated with the second user account occurring after the second user account accessed the second digital training resource; and causing transmission, to the user account, of an actionable notification indicating that the user account has been assigned additional training for the target technology, the additional training comprising the second digital training resource.

20. The computer program product of claim 19, wherein the software instructions, when executed, further cause the apparatus to:

detect metric data associated with the target technology within a database of the computing device or within a transmission entering or exiting the network channel;

record a copy of the metric data to a remotely accessible database;

segment the copy of the metric data into code elements or tokenized text;

classify, based on the code elements or the tokenized text, at least a portion of the copy of the metric data into one or more of an engagement metric classification or a sentiment metric classification;

generate the engagement metric in an instance in which the copy of the metric data is classified, at least in part, into the engagement metric classification; and generate a sentiment metric in an instance in which the copy of the metric data is classified, at least in part, into the sentiment metric classification, wherein the metric data defines a non-standardized format and the engagement metric and the sentiment metric each define a standardized format defined by the machine learning monitoring application.

* * * * *